(12) United States Patent
Weinstein et al.

(10) Patent No.: US 9,019,981 B1
(45) Date of Patent: Apr. 28, 2015

(54) PROTOCOL FOR MULTICASTING IN A LOW BANDWIDTH NETWORK

(75) Inventors: Joseph Jacob Weinstein, Somerville, MA (US); Joseph Michael Keller, Ledyard, CT (US); Vladimir Rosenzweig, Belmont, MA (US); Keith William Manning, Arlington, MA (US); Daniel Alan Coffin, Sudbury, MA (US)

(73) Assignees: Verizon Patent and Licensing Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 3218 days.

(21) Appl. No.: 11/088,185

(22) Filed: Mar. 23, 2005

Related U.S. Application Data

(60) Provisional application No. 60/556,423, filed on Mar. 25, 2004.

(51) Int. Cl.
*H04J 3/26* (2006.01)
*H04B 1/719* (2011.01)
*H04J 1/16* (2006.01)

(52) U.S. Cl.
CPC ...................................... *H04B 1/719* (2013.01)

(58) Field of Classification Search
USPC .......... 709/230, 238, 432; 370/230, 236, 432, 370/464–469
See application file for complete search history.

(56) References Cited

U.S. PATENT DOCUMENTS

| | | | | |
|---|---|---|---|---|
| 6,331,983 B1 * | 12/2001 | Haggerty et al. | ............. | 370/400 |
| 6,631,420 B1 * | 10/2003 | Li et al. | ......................... | 709/242 |
| 6,728,777 B1 * | 4/2004 | Lee et al. | ...................... | 709/238 |
| 6,885,675 B1 * | 4/2005 | Gibbings | ...................... | 370/433 |
| 6,965,579 B1 * | 11/2005 | Shin | .............................. | 370/312 |
| 6,977,937 B1 * | 12/2005 | Weinstein et al. | ............. | 370/401 |
| 7,127,610 B1 * | 10/2006 | Li et al. | ......................... | 713/163 |
| 7,447,225 B2 * | 11/2008 | Windisch et al. | ............. | 370/428 |
| 2001/0034793 A1 * | 10/2001 | Madruga et al. | ............. | 709/238 |
| 2002/0181423 A1 * | 12/2002 | Chen et al. | ..................... | 370/337 |
| 2003/0016690 A1 * | 1/2003 | Jordan | ......................... | 370/433 |
| 2003/0193958 A1 * | 10/2003 | Narayanan | .................... | 370/400 |
| 2003/0223402 A1 * | 12/2003 | Sanchez et al. | ............... | 370/351 |
| 2004/0019737 A1 * | 1/2004 | Kastoriano et al. | ............ | 711/104 |
| 2005/0141502 A1 * | 6/2005 | Kumar et al. | ................. | 370/390 |
| 2005/0232281 A1 * | 10/2005 | Rosenzweig et al. | ......... | 370/400 |

OTHER PUBLICATIONS

RFC 2328 "OSPF version 2" J. Moy, Apr. 1998; retrieved on Feb. 29, 2008, www.ietf.org/rfc/rfc2328.txt.*
Protocol design for anycast communication in IPv6 network Doi, S.; Ata, S.; Kitamura, H.; Murata, M.; Miyahara, H.; Communications, Computers and signal Processing, 2003. PACRIM. 2003 IEEE Pacific Rim Conference on vol. 1; Publication Year: 2003 , pp. 470-473 vol. 1.*
Bill Fenner et al., "Protocol Independent Multicast—Sparse Mode (PIM-SM): Protocol Specification (Revised)," draft-ietf-pim-sm-v2-new-07, Mar. 2003, published by the IETF.

(Continued)

*Primary Examiner* — Xavier S. Wong

(57) ABSTRACT

A modified protocol independent multicast (M-PIM) routing protocol is an improvement to protocol independent multicast (PIM) routing protocol. M-PIM is optimized for use with at least one low bandwidth multi-hop network. The improvement comprises at least one modification to PIM that facilitates the transport of multicast traffic in a multi-layer routing system.

86 Claims, 9 Drawing Sheets

(56) References Cited

OTHER PUBLICATIONS

R. Coltun et al., RFC 2740, "OSPF for IPv6," Dec. 1999, distributed as an Internet Draft by the Network Working Group of the Internet Engineering Task Force (IETF) organized by the Internet Society of Reston, Virginia.
J. Postel, RFC 0791, "Internet Protocol," Sep. 1981, published by the Internet Society of Reston, Virginia.
J. Postel, RFC 0792, "Internet Control Message Protocol," Sep. 1981. published by the Internet Society of Reston, Virginia.
J. Postel, RFC 0768, "User Datagram Protocol," Sep. 1981. published by the Internet Society of Reston, Virginia.
F. Baker, Ed., RFC 1812 , "Requirements for IP Version 4 Routers," Jun. 1995, published by the Internet Society of Reston, Virginia.
S.E. Deering, RFC 988, "Host Extensions for IP Multicasting," Jul. 1986, published by the Internet Society of Reston, Virginia.
S.E. Deering, RFC 1054, "Host Extensions for IP Multicasting," May 1988, published by the Internet Society of Reston, Virginia.
W. Fenner, RFC 2236, "Internet Group Management Protocol, Version 2," Nov. 1997, published by the Internet Society of Reston, Virginia.
B. Cain et al., RFC 3376, "Internet Group Management Protocol, Version 3," Oct. 2002, published by the Internet Society of Reston, Virginia.
D. Estrin et. al., RFC 2362, "Protocol Independent Multicast—Sparse Mode (PIM-SM): Protocol Specification," Jun. 1998, published by the Internet Society of Reston, Virginia.
Steven Deering et al, "Protocol Independent Multicast Version 2, Dense Mode Specification, Draft 5" May 1997, distributed as an Internet Draft by the Network Working Group of the Internet Engineering Task Force (IETF) organized by the Internet Society of Reston, Virginia.
D. Thaler, RFC 2715, "Interoperability Rules for Multicast Routing Protocols," Oct. 1999, published by the Internet Cociety of Reston, Virginia.

\* cited by examiner

PROTOCOL FOR MULTICASTING IN A LOW BANDWIDTH NETWORK

RELATED APPLICATION

This application claims priority to U.S. provisional application Ser. No. 60/556,423, entitled "R-PIM (RADIO PROTOCOL INDEPENDENT MULTICAST) SM (SPARSE MODE) AND DM (DENSE MODE)," filed Mar. 25, 2004, which application is hereby incorporated herein by reference in its entirety.

Certain subject matter disclosed and claimed herein was developed under a sub-contract to a contract with the United States government (No. DAAB07-02-C-C403). The US Government has certain rights in this invention.

BACKGROUND

It is well known to send and receive multicast data traffic over an Internet Protocol (IP) network. The following documents, all incorporated by reference herein in their entireties, discuss IP: J. Postel, RFC 0791, "Internet Protocol," September 1981; J. Postel, RFC 0792, "Internet Control Message Protocol," September 1981; J. Postel, RFC 0768, "User Datagram Protocol," September 1981; F. Baker, Ed., RFC 1812, "Requirements for IP Version 4 Routers," June 1995, all published by the Internet Society of Reston, Va., and all available on the world wide web. It is further well known for hosts, e.g., computers on a network, to report their membership in a group of hosts that receives a particular multicast, i.e., a group of destinations for a particular set of multicast data packets. For example, management of multicast groups according to the Internet Group Management Protocol (IGMP) is discussed in S. E. Deering, RFC 988, "Host Extensions for IP Multicasting," July 1986; S. E. Deering, RFC 1054, "Host Extensions for IP Multicasting," May 1988; W. Fenner, RFC 2236, "Internet Group Management Protocol, Version 2," November 1997; B. Cain et al., RFC 3376, "Internet Group Management Protocol, Version 3," October 2002; all published by the Internet Society of Reston, Va., all available on the world wide web, and all incorporated herein by reference in their entireties.

Under the known IP multicast forwarding model, multicast traffic is essentially forwarded along a tree that is rooted at the traffic source. Each recipient of the multicast traffic (i.e., each group member) is at a leaf of the tree, and multicast routers at the vertices. According to the known IP multicast forwarding model, forwarding decisions for each packet are made independently at each multicast router, based upon the source of the packet and its destination group. For example, varieties of Protocol Independent Multicast (PIM), known to those skilled in the art, use a multicast topology table referred to herein as the Multicast Routing Information Base (MRIB) to populate routing tables stored in routers. Each router in the network uses the MRIB to determine next-hop routers. A data packet may be sent to more than one router. Duplicate elimination is performed at each multicast router by only accepting incoming packets arriving on the expected incoming edge of the tree (rather than, for example, according to a sequence number assigned to the incoming packet). In most multicast routing protocols, including PIM, the forwarding tree is usually a reverse shortest-path tree (e.g., it contains the shortest path from each member of the group that receives the multicast back to the multicast source), although, as is known, PIM may deviate slightly from this shortest-path model when needed to resolve parallel entry points to a single multi-access network.

Table 1 shows an exemplary, simplified version of an IP multicast forwarding table for a multicast router in a network using PIM.

TABLE 1

| Indices | | | Forwarding Information | | | |
|---|---|---|---|---|---|---|
| Source S | Destination Group G | Incoming Interface | Outgoing Interface eth0 | Outgoing Interface eth1 | Outgoing Interface eth2 | Outgoing Interface eth3 |
| 128.89.17.1 | 225.0.0.1 | Eth0 | Off | On | On | On |
| 128.89.17.1 | 227.9.9.2 | Eth0 | Off | On | Off | Off |
| 128.89.13.1 | 225.0.17.29 | Eth0 | Off | On | Off | On |
| 114.27.14.2 | 226.7.7.9 | Eth1 | On | Off | On | On |

Table 1 is indexed by source S and destination group G, and assumes that the router has four interfaces. Each entry specifies the incoming interface from which to accept packets from a source S; packets arriving over any other interface from that source S are ignored as probable duplicates. Further, each entry specifies, for each possible outgoing interface, whether packets from a source S to a particular destination G are to be forwarded via that outgoing interface.

Note that Table 1 does not control or even specify which routers or hosts on the outgoing interface(s) are to receive the forwarded packet. That is, decisions regarding whether to accept an incoming packet, and how to forward it, are based upon a table indexed by packet source S and destination group G. Thus, Table 1, for example, specifies, for each source S and group G, the incoming interface from which to accept the packet, and the outgoing interfaces onto which to forward the packet. Because these forwarding decisions depend upon the packet source S as well as destination group G, multicast forwarding is very different from unicast forwarding, which depends upon a packet's destination alone.

As just discussed, an important peculiarity of the IP multicast forwarding model is that forwarding decisions are actually based upon network interfaces, not next-hop or previous-hop routers. The decision as to whether to accept a multicast packet is based upon the interface through which the packet arrives, not the previous-hop router. Likewise, a multicast forwarding table actually specifies the outgoing interfaces through which to forward the packet, not the next hop routers. The multicast forwarding model implicitly assumes that the multicast packet is then available for reception at every router and host connected to the network attached to that interface, so that the decision whether or not to accept the packet is actually made by the recipient. This model is well-matched to wired broadcast networks such as Ethernets, where the cost of delivering a packet to every router and host on a particular network is no higher than the cost of delivering it to just one. However, the existing multicast forwarding model is poorly adapted to other kinds of networks where the cost of delivering a packet to multiple recipients is significantly higher than the cost of delivering the packet to just one recipient alone. This is especially true for multi-hop networks having high costs associated with delivering data packets, such as radio networks, acoustic networks, etc., that provide minimal bandwidth, uncertain reliability, and transmission delays.

PIM, mentioned above, is a known approach for routing data to multi-cast groups in, or spanning, networks, such as wide-area networks (WANs). The designation "Protocol Independent" refers to PIM's ability to co-exist with a wide variety of Internet Protocol (IP) unicast routing protocols. Known variants of PIM include at least a "sparse mode" (SM) version, PIM-SM, and a "dense mode" (DM) version, PIM-DM. PIM-SM has been described in D. Estrin et. al., RFC 2362, "Protocol Independent Multicast-Sparse Mode (PIM-SM): Protocol Specification," June 1998, published by the Internet Society of Reston, Va. and available on the world wide web, fully incorporated by reference herein in its entirety. PIM-DM has been described in Steven Deering et al, "Protocol Independent Multicast Version 2, Dense Mode Specification, Draft 5" May 1997, distributed as an Internet Draft by the Network Working Group of the Internet Engineering Task Force (IETF) organized by the Internet Society of Reston, Va., also fully incorporated by reference herein in its entirety. The present disclosure includes references to both PIM-SM and PIM-DM, and, in cases where a reference to both PIM-SM and PIM-DM is intended, will refer simply to "PIM." Inasmuch as PIM is well known and understood in the art, it is not necessary to provide herein details regarding every aspect of PIM. However, certain aspects of PIM relevant to this disclosure are discussed briefly below for the purpose of providing background and context to the present disclosure.

According to PIM-SM, the MRIB (i.e., the multicast topology table mentioned above) is established and maintained by means of what are known as JOIN/PRUNE messages, and used for the routing of multicast traffic. PIM-SM is a proactive protocol, meaning that potential recipients must explicitly join a group through use of JOIN/PRUNE messages before it can receive any data for that group, and must explicitly leave the group to cease receiving data. A network using PIM-SM will have at least one specially configured router referred to as a rendezvous point (RP). An RP serves as the root of a distribution tree for a group of multicast receivers (i.e., a group of recipients of multicast traffic) in cases in which the distribution tree is not specific to any one source of multicast traffic. A single PIM-SM router per network acts as a designated router (DR) on behalf of all hosts (i.e., receivers of multicast data) that are connected to that network, e.g., a local area network (LAN). For each group for which it has active members, a DR periodically sends JOIN/PRUNE messages to the RP. The purpose of JOIN/PRUNE messages is simple. Regarding Joins, a prerequisite to receiving traffic directed toward a particular group is joining the group. Regarding Prunes, once a multicast has ended, or the host is no longer interested in receiving it, the host wishes to be removed from the group.

PIM-DM, unlike PIM-SM, is a reactive protocol. That is, all potential recipients by default receive multicast traffic for all groups. Recipients that do not wish to receive this data may suppress it by sending JOIN/PRUNE messages. PIM-DM thus differs from PIM-SM in two ways. First, PIM-DM does not need, and does not define, rendezvous points. Second, PIM-DM does not automatically transmit JOIN/PRUNE messages on a periodic basis, which instead must be explicitly triggered. PIM-DM is by design most applicable when the number of sources per group is small, and almost every potential recipient belongs to almost every group. Table 2 provides an overview of considerations relevant to determining when each of PIM-SM and or PIM-DM can and/or should be used for a particular application.

TABLE 2

| Consideration | PIM-DM | PIM-SM |
| --- | --- | --- |
| Large number of multicast sources per group | NO (PRUNE scaling) | YES |
| Low data rate per source | NO (PRUNE overhead may exceed user traffic) | YES |
| Bursty source | NO (PRUNE ineffective due to propagation delay) | YES, as long as thresholds for switching to source-based trees are adjusted so that traffic bursts do not create topological oscillations |
| Localized group membership | NO (PRUNE overhead is inflicted on entire network universe) | YES |
| Small number of sources each with high uniform data rate, with group members widely dispersed | YES | YES |
| Rapidly changing group memberships | YES | YES |
| Avoid single point-of-failure vulnerabilities | YES | PARTIAL (new rendezvous-point must be elected if previous RP fails) |

Although PIM, by its very name, is supposed to be protocol independent, it actually is designed for routing over multiple single-hop networks such as Ethernets and point-to-point wired links. When employed over multiple large, low-bandwidth, multi-hop networks, PIM as presently known suffers from a number of deficiencies, and would function very poorly. Certain of these deficiencies are discussed in turn below.

Lack of Support for Layered Networks

PIM as presently known lacks support for layered network structures. Like most IP multicast routing protocols, PIM forwards multicast traffic according to a determination of a network interface, not according to a determination of a "next hop" router. PIM implicitly assumes that multicast traffic forwarded onto a particular network will be delivered non-selectively to every router on that network, regardless of whether or not that router actually has any downstream group members to which that traffic is to be delivered. Stated another way, PIM as presently known assumes that every multicast router is implicitly a member of every multicast group for which traffic has been injected onto the networks to which the router is attached.

The known PIM model is appropriate for an Ethernet, but not for a multi-hop, low bandwidth network such as some wireless networks. On an Ethernet, the bandwidth consumed by multicasting a packet to every node on the network is no different from the bandwidth consumed by unicasting it to a single node or multicasting it to selected nodes. Consequently, no efficiency is lost if every multicast router simply puts its Ethernet interface into "promiscuous multicast" mode, meaning that it is to receive all multicast traffic.

On a multi-hop, low-bandwidth network, however, there are significant costs to be borne if every multicast router is to receive all multicast traffic. For example, certain possibilities for reusing router space can only be exploited if distribution of multicast traffic within the low-bandwidth network can be limited to the necessary recipients. If all routers with downstream group members are geographically localized, it is highly wasteful to deliver multicast traffic for that group to other, remote routers that do not need the information. Accordingly, "promiscuous multicast" mode can have a significant effect on bandwidth consumption in the low-bandwidth network having a large number of small, localized groups.

Scaling of Hello Messages to Large Networks

As is known, each PIM router generates a HELLO message that must be multicast (broadcast) to every other router on a network. Even with net wide broadcast implemented through a minimal connected cover of broadcast relays, the bandwidth consumed by these HELLO messages at a minimum increases linearly with the number of routers on the network. Furthermore, when every router on a network is also a PIM router, most of the HELLO messages are wasted; the set of PIM neighbors is identical to the set of unicast routing neighbors, and can be determined from this set.

Graph 100 shown in FIG. 1 plots bandwidth consumption caused by HELLO messages as the number of routers in a network increases. The bandwidth capacity of a typical network is shown by line 110 superimposed on the graph 100. The bandwidth consumed by PIM HELLO messages is shown by a line 120. As can be seen, the bandwidth consumed by HELLO messages on a network with a total capacity of only about 2 megabytes per second, such as a radio network, is problematic when the network grows to even a few hundred nodes. As a rough rule of thumb, it is generally desirable that network routing overhead from all sources and layers combined not exceed ten percent of the total network capacity. The overhead from PIM HELLO messages alone from each layer would approach this ten percent limit in a radio node network with one or two thousand nodes. Particularly in a layered network environment, the combined HELLO overhead from all layers would clearly be prohibitive.

As discussed above, the bandwidth consumed by PRUNE/JOIN messages is independent of the number of routers on a network. However, the load from HELLO messages grows with the number of routers on a network and presently imposes severe limits on the scalability of radio networks.

Scaling of Assert Messages to Large Networks

On a multi-hop low bandwidth network, where the unicast cost may be different for each pair of routers, the usual PIM reverse-shortest-path rule, known to those skilled in the art, will not necessarily select a single entry point for each multicast source as it would on a standard Ethernet on which the unicast cost is essentially the same for each pair of routers. However, routers configured according to PIM as presently known will nevertheless attempt to enforce a single entry point, which would be elected through an exchange of ASSERT messages.

Graph 200 shown in FIG. 2 plots bandwidth consumption caused by ASSERT messages as the number of routers in a network increases. The bandwidth capacity of a typical network is shown by line 210 superimposed on the graph 200. The bandwidth consumed by PIM ASSERT messages is shown by line 220. As can be seen, the bandwidth consumed by ASSERT messages on a network with a total capacity of only about 2 megabytes per second, such as a radio network, is problematic when the network grows to even a few hundred nodes. In particular, enforcement of a single entry point by means of ASSERT messages poses several difficulties.

First, enforcement of a single entry point does not necessarily lead to routes for user multicast traffic that are optimal or close to optimal, particularly when the exit points are sparse and distant from each other.

Moreover, as illustrated by FIG. 2, ASSERT messages themselves do not scale well to large networks. The bandwidth consumed by ASSERT messages for PIM-DM is proportional to the product of the number of groups, times the number of sources per group, times the number of distinct entry points per source computed by the reverse-shortest-path algorithm. This relationship may be expressed as follows:

$$\text{Bandwidth} = (N_{Groups})(N_{Srcs}/\text{Group})(N_{EntryRtrs}/\text{Src}).$$

For PIM-SM, the above relationship differs only in that the number of sources is replaced by the number of distribution trees (1 for the RP tree+1 for each source rooted tree):

$$\text{Bandwidth} = (N_{Groups})(N_{Trees}/\text{Group})(N_{EntryRtrs}/\text{Src}).$$

Thus, ASSERT messages scale more poorly than JOIN/PRUNE messages discussed above by an additional factor proportional to the number of distinct entry points per source, i.e., $N_{EntryRtrs}$/Group/Src. As shown in FIG. 2, the bandwidth consumed by such ASSERT messages can be significant. Consequently, the bandwidth load from ASSERT messages can severely limit the scalability of a radio network to large numbers of groups and sources.

Further, when transit delays are large, or completion rates are low, the ASSERT mechanism for electing a preferred entry point becomes ineffective at suppressing unneeded user traffic. Entry points losing the election will continue to inject duplicate user traffic until such time as they receive an ASSERT from the winner of the election.

Scaling of Bootstrap and CANDIDATE_RP_ADVERTISEMENT Messages

PIM-SM as presently known elects rendezvous points through exchange of communication messages such as BOOTSTRAP and CANDIDATE_RP_ADVERTISEMENT messages, which are known and understood by those skilled in the art. The bandwidth consumed by the bootstrap procedure of PIM-SM is proportional to the product of the number of groups and the number of candidate rendezvous points per group. This relationship may be expressed as follows:

$$\text{Bandwidth} = (N_{Groups})(N_{candidate\text{-}RPs}/\text{Group}).$$

For maximum robustness in the face of possible partitioning of a routing domain (including failure or destruction of routers), every group member in the routing domain would have to be a candidate rendezvous point. In such a case, the bandwidth consumed by the bootstrap procedure would be proportional to the product of the number of groups times the number of members per group in the entire routing domain. This relationship may be expressed as follows:

$$\text{Bandwidth} = (N_{Groups})(N_{Members}/\text{Group}).$$

Note that the number of members in the routing domain may be much larger than the number of exit points from the low bandwidth network itself.

Consequently, the bootstrap mechanism of PIM-SM limits scalability to large numbers of group members—unless, of course, one is willing to accept a lower degree of robustness.

CONCLUSION

In accordance with the foregoing, it would be desirable for a multicast routing protocol to support one or more low bandwidth multi-hop networks such as a radio network, e.g., a mobile network, having potentially thousands of nodes, both ground-based and airborne, spread across an operating area of up to several thousand square kilometers. It would further be desirable for such a multicast protocol to be fully compatible with standard commercial PIM-DM and PIM-SM (especially as implemented by Cisco Systems, Inc., of San Jose, Calif.) on all interfaces to high bandwidth networks. Such a multicast protocol would advantageously provide delivery rates and general reliability sufficient for commercial, governmental, and military purposes. To this end, it would be desirable to provide operability over shared multi-hop low-bandwidth channels, e.g., channels with bandwidth less than 2 megabits per second. It would further be desirable for a multicast protocol to provide compatibility with known routing protocols such as R-OSPF, used as a unicast routing protocol on the radio network, and described in presently co-pending U.S. application Ser. No. 10/752,988, entitled "SYSTEMS AND METHODS FOR CONSTRUCTING A VIRTUAL MODEL OF A MULTI-HOP, MULTI-ACCESS NETWORK," listing inventors in common and having an assignee in common with the present application, herein fully incorporated by reference in its entirety.

Moreover, it would be desirable for a multicast protocol that would optimize the maximum number of supportable groups receiving multicast traffic on the radio network, the maximum number of supportable multicast sources per group, the maximum number of supportable members per group, the maximum user traffic rate per group, the maximum number of supportable sources across the entire network, the maximum number of supportable members across the entire network, the maximum user traffic rate across the entire network, and the minimum amount of control overhead.

DETAILED DESCRIPTION

Introduction

The advantages of the embodiments disclosed and claimed herein are obtained from a novel protocol known as Multi-hop layered PIM (M-PIM), which provides significant improvements over the known PIM protocol, discussed above, particularly in the context of low-bandwidth multi-hop networks such as radio networks, acoustic networks, etc. As will be seen, many of these advantages are obtained by manipulating group memberships at lower layers in a layered network environment.

Figure 1:
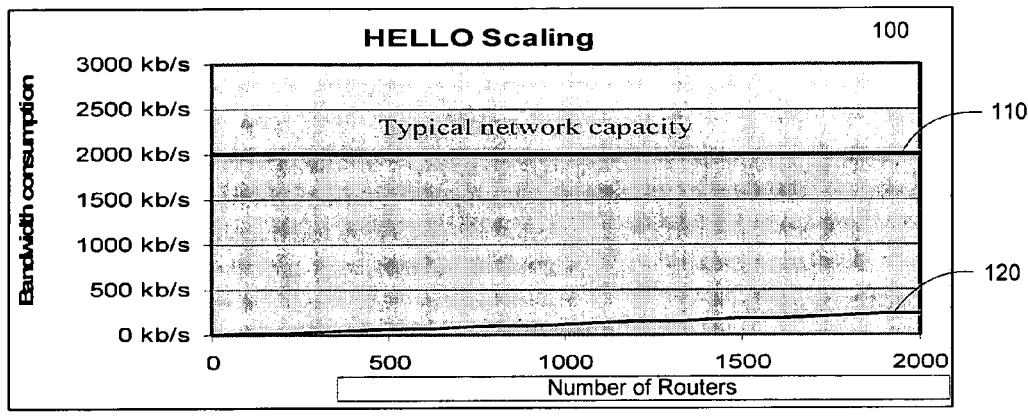
FIG. 1 shows a graph that plots bandwidth consumption caused by HELLO messages as the number of routers in a network increases
Figure 2:
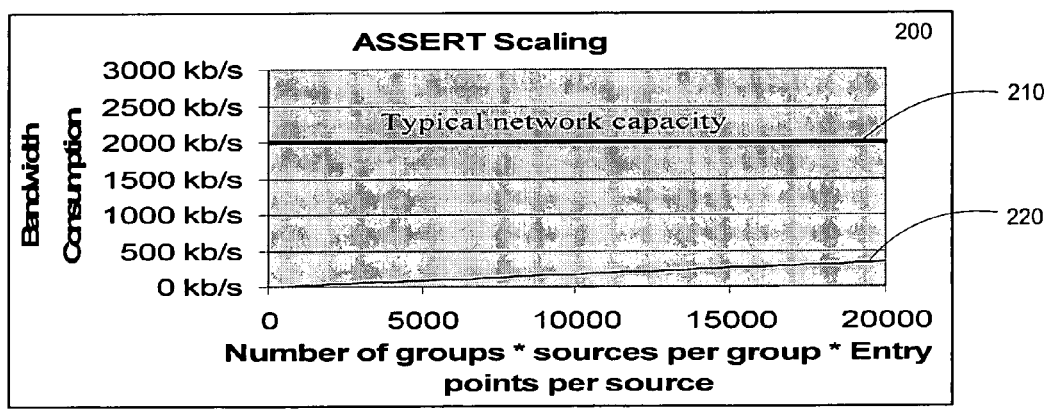
FIG. 2 shows a graph that plots bandwidth consumption caused by ASSERT messages as the number of routers in a network increases.
Figure 3:
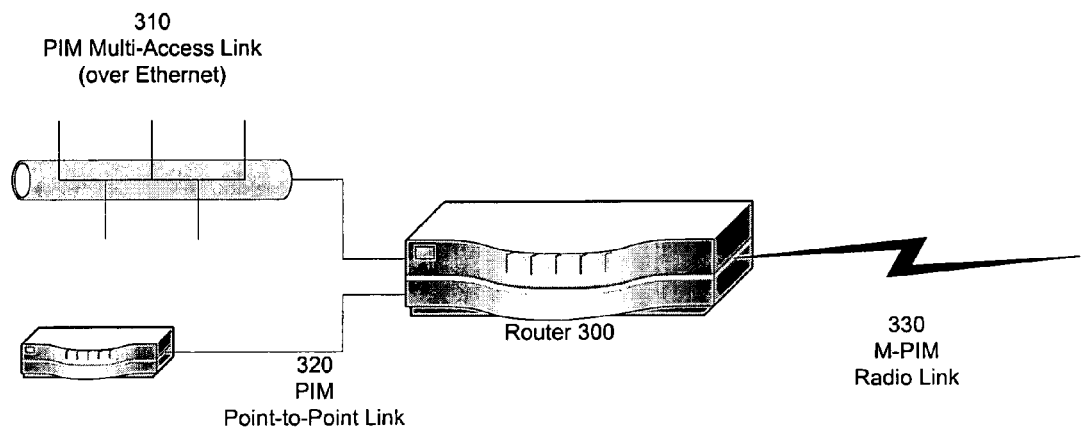
FIG. 3 is a block diagram showing a router having links according to both PIM and M-PIM, according to an embodiment.

PIM as presently known, including PIM-DM and PIM-SM, operates over three basic types of links: (1) multi-access links that are broadcast capable, (2) point-to-point links, and (3) virtual links. M-PIM, including M-PIM-DM and M-PIM-SM, adds a fourth link type: multi-access, multi-hop links. As is shown FIG. 3, known PIM protocols may be used on multi-access, point-to-point, and virtual links, while the M-PIM protocols are used over multi-access, multi-hop links. A router 300 is connected to a PIM multi-access link 310, a PIM point-to-point link 320, as well as an M-PIM multi-access, multi-hop Radio link 330. It should be understood that router 300 includes computer executable instructions for transporting data packets according to both PIM and M-PIM, and further that the router 300 includes computer executable instructions for receiving data packets over links 310, 320, and 330, and for determining over which of links 310, 320, and 330 a data packet should be transported.

Multi-access, multi-hop low bandwidth links such as link 330 are designed for use over low-bandwidth networks generally implemented at a lower networking layer, as explained in more detail below. Such networks require a different implementation of PIM, because, as discussed above, their properties are very different from those of either a wired point-topoint or wired multi-access (e.g., Ethernet-like) network. As disclosed herein, M-PIM extends and modifies PIM to advantageously accommodate the particular properties of multi-access, multi-hop low bandwidth networks.

Accordingly, M-PIM uses known PIM data structures, in particular the interface state tables that are known to those skilled in the art. Further, M-PIM routes messages according to the format specified by PIM, and generally carries known PIM routing message types such as source-specific JOIN/ deliberate decision that had been made in the design of PIM, namely, acceptance of greater overhead in return for more independence from the unicast routing protocol.

Table 3 summarizes certain differences between PIM and M-PIM in some embodiments. However, it should be understood that Table 3 is presented solely for the convenience of the reader and is not necessarily an exhaustive list of such differences, and that other novel features of M-PIM may be disclosed and claimed herein.

TABLE 3

| Point-to-Point Links | Multi-access Links | Multi-hop Low Bandwidth Links |
|---|---|---|
| Dependencies Upon Unicast Routing Protocol | | |
| Can operate over a wide variety of unicast routing protocols | Can operate over a wide variety of unicast routing protocols | Specifically designed to operate over R-OSPF. May or may not be usable over other routing protocols |
| Neighbor discovery | | |
| Neighbors are discovered through a combination of configuration and HELLO messages | Neighbors are discovered via HELLO messages | Neighbors are discovered via routing information extracted from the IP unicast forwarding table. Over-the-air HELLO messages are not used |
| Loss of a neighbor is discovered by cessation of HELLO messages | Loss of a neighbor is discovered by cessation of HELLO messages | Loss of a neighbor is discovered by deletion of all one-IP-hop routes to that neighbor via the radio network interface from the IP unicast forwarding table |
| Rendezvous-Points and Rendezvous-Point Election (PIM-SM Only) | | |
| Rendezvous-Points are elected via communication messages such as CANDIDATE_RP_ADVERTISEMENT and BOOTSTRAP messages. Scaling problems arise if the number of candidate rendezvous-points is large | Rendezvous-Points are elected via communication messages such as CANDIDATE_RP_ADVERTISEMENT and BOOTSTRAP messages. Scaling problems arise if the number of candidate rendezvous-points is large | Rendezvous-Points are elected via optimized communication messages such as CANDIDATE_RP_ADVERTISEMENT and BOOTSTRAP messages, which permits a much larger number of candidate rendezvous-points (for redundancy to avoid single point-of-failure) without encountering scaling problems |
| Multicast Route Maintenance | | |
| Multicast routes are maintained via PRUNE/JOIN messages Redundant PRUNE/JOIN suppression is optional Parallel entry points are resolved via ASSERT messages | Multicast routes are maintained via PRUNE/JOIN messages Redundant PRUNE/JOIN suppression is optional Parallel entry points are resolved via ASSERT messages | Multicast routes are maintained via PRUNE/JOIN messages Redundant PRUNE/JOIN suppression is necessary to achieve scaling In PIM-SM, parallel entry points are resolved as a side effect of JOIN/PRUNE messages. ASSERT messages are not needed. In M-PIM-DM, optimized group-independent ASSERT messages are employed |
| All standard PIM control message types are supported | All standard PIM control message types are supported | All standard PIM control message types are supported |

PRUNE messages, RP-specific JOIN/PRUNE messages (PIM-SM only), and GRAFT messages (PIM-DM only). However, M-PIM advantageously differs from PIM in the mechanisms by which it distributes these messages across radio links, and in the format and usage of "link-local" message types such as HELLO messages that are exchanged only among immediate neighbors. Thus, an M-PIM network can be seamlessly integrated into a PIM domain, with external PIM-only routers remaining unaware that a custom protocol, i.e., M-PIM, is being employed over certain networks links.

Figure 4:
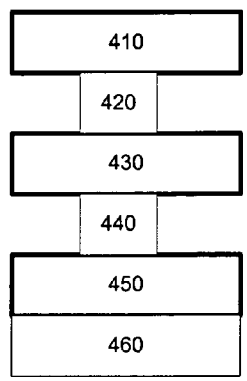
FIG. 4 is a block diagram showing a multicast layering model present in certain embodiments.

M-PIM achieves better performance than PIM, in part by exploiting more information from the known unicast routing protocol. Whereas PIM is designed to operate over a wide range of potential unicast routing protocols, M-PIM may be specifically designed to operate over a single unicast routing protocol such as R-OSPF and may or may not be usable in conjunction with other unicast routing protocols. In short, it should be understood that M-PIM consciously reverses a II. Network Environment II.A. Multicast Network Layering Model FIG. 4 is a block diagram showing a multicast layering model present in certain embodiments. Top layer 410 and middle layer 430 are connected by an interface 420. Layers 410 and 430 may be IP multicast networks, such as are known in the art, using either PIM-SM or PIM-DM. Interface 420 is a network interface such as is known to those skilled in the art, and in some embodiments may include an encryption routine or other rules for processing and/or transforming data. Interface 440 connects IP layer 430 to intranet layer 450. Intranet layer 450 may have its own, private unicast and multicast routing protocols which may be different from Internet standards and are customized for the specific needs of the situation. Full multicast routing is provided at each of layers 410, 430, and 450. Each of layers 430 and 450 serves as a link layer to the layer above it, providing what amounts to link-layer transport services across a sub-network that may be substantially smaller than the higher-layer network. It should be understood that FIG. 4 is intended to be exemplary, and, as will be clear from the discussion below, layers 410, 430, and 450 could include only two layers, e.g. 410 and 450, or could include more layers than layers 410, 430, and 450 shown on FIG. 4.

Figure 5:
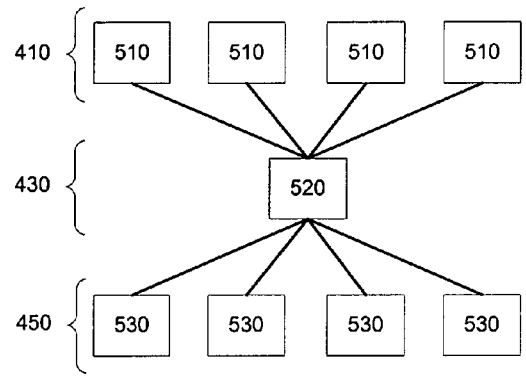
FIG. 5 is a block diagram showing multiple independent top layer IP networks layered over a single middle layer IP network, according to certain embodiments.

FIG. 5 is a block diagram showing multiple independent top layer 410 IP networks 510 layered over a single middle layer 430 IP network 520, according to certain embodiments. In one embodiment, each network 510 represents a separate security community, and accordingly, each network 510 is isolated from the network 520 and other networks 510 by a separate encryption layer. In another possible embodiment, each network 510 may be a Virtual Private Network (VPN). Networks 510 may, or may not, be co-extensive with the network 520. That is, not all routers in network 520 necessarily have a counterpart in every network 510. Furthermore, as shown is FIG. 5, a single network 520 may be layered over multiple low bandwidth layer 450 networks 530 (e.g., mobile intranets), in which case each network 530 appears to the network 520 as a separate IP network interface and serves as a link provider to network 530. It should be understood that FIG. 5 is intended to be exemplary, and that each of layers 410, 430, and 450 may comprise one or more networks.

It further should be understood that full multicast routing support is essential at each of layers 410, 430, and 450 in order to support arbitrary network topologies without risk of looping or blind holes. It is not feasible to regenerate upper layer multicast routing information from lower layer information because the lower layers have a more restricted view of the network universe and hence do not carry the necessary information. Nor, due to the nature of PIM, can one derive lower-layer multicast routing information from upper layers, except at the edges of the lower layer network.

Figure 6:
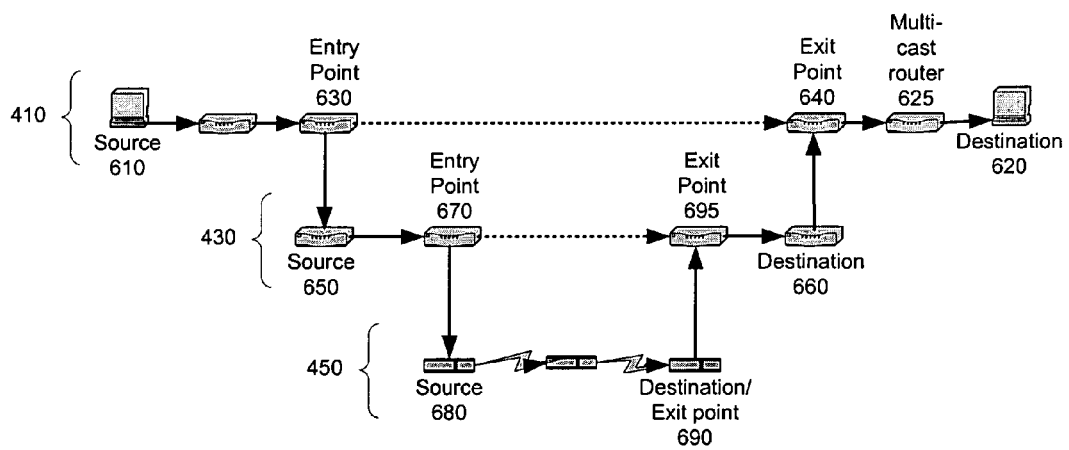
FIG. 6 depicts the path followed by a data packet from a top layer source in a network to a destination belonging to a multicast group, in the same or a different network, according to an embodiment.

FIG. 6 depicts the path followed by a data packet from a top layer 410 source 610 in a network 510 to a destination 620 belonging to a multicast group, hereinafter referred to as $G_{top}$, in the same or a different network 510. As shown, the data packet flows from the top source 610 to a top layer 410 destination 620 belonging to group $G_{top}$, across one or more top layer 410 networks 510, along a route determined by top layer 410 IP multicast routing.

As shown in FIG. 6, one or more of top layer 410 network links may actually be implemented over a middle layer 430 IP network (e.g., a network 520). In such a case, the data packet flows down to the middle layer 430 at an entry point 630 (i.e., an entry router) to a source router 650 in a network 520. The data packet then flows from the entry point 630 to an exit point 640, i.e., an exit router, from the middle network 520 across one or more links along a route determined by middle layer 430 IP multicast routing.

At a middle destination 660 belonging to a group $G_{middle}$ the data packet is returned to the top layer 410 network 510 for further forwarding. The top entry point 630 to the middle network 520 becomes a source $S_{middle}$ as seen by the middle network 520, and the exit point 640 from the middle network 520 becomes a member of the destination group $G_{middle}$ seen by the middle network 520. The selection of the entry point 630 to the middle IP network 520 and a destination 660 from the middle IP network 520 is a function of top layer 410 IP multicast routing, while routing between those points within the middle IP network 520 is a function of middle layer 430 IP multicast routing.

Similarly, one or more of the middle network links may actually be implemented over one or more low bandwidth layer 450 networks such as a network 530. At an entry point 670 to a low bandwidth network 530 the packet flows down to the low bandwidth layer 450. The data packet then flows from the entry point 670 to an exit point from the low bandwidth network 530 across one or more low bandwidth links, beginning with a source point 680, along a route determined by low bandwidth layer 450 multicast routing. At the low bandwidth destination 690, the packet is returned to the middle IP layer 430 for further forwarding. The middle IP entry point 680 to the low bandwidth network becomes the source $S_{M1}$ as seen by the low bandwidth layer, and destination 690, an exit point from the low bandwidth network 530, becomes a member of the destination group $G_{M1}$ as seen by the low bandwidth network 530. The selection of the entry point 680 to the low bandwidth network 530 and the destination 690 from the low bandwidth network 530 is a function of middle layer 430 IP multicast routing, while routing between those points within the low bandwidth network 530 is a function of low bandwidth layer 450 multicast routing.

As has been seen, multicast routing at each layer 410, 430, and 450 serves to determine the entry points 630 and 670 for data packets to the next lower layer and the exit points 690 and 695 from that layer. For example, top layer 410 IP multicast routing would be responsible for determining that multicast traffic from top source $S_{top}$ to top group $G_{top}$ should enter the middle layer 430 IP sub-network at some entry point router $E=S_{middle}$ and exit it at those middle routers that belong to middle group $G_{middle}$. Top layer 410 multicast routing would also be responsible for determining the set of middle layer 430 routers that should belong to group $G_{middle}$, which in turn constitute the set of exit points/destinations 660 from the middle sub-network 520. As a multicast data packet propagated through the network from top source $S_{top}$ to the members of top group $G_{top}$, it would enter the lower-layer 430 middle sub-network 520 at the entry point 650 which would then become the middle layer 430 source $S_{middle}$ for the packet. Middle layer 430 IP multicast routing would distribute the data packet to all members of middle group $G_{middle}$, where it would exit the lower-layer 430 middle sub-network 520. Top layer 410 multicast routing then resumes the task of forwarding the data packet onwards to the members of its original top destination group $G_{top}$, once again using $S_{top}$ as its source.

As should be clear from the foregoing discussion, it is the responsibility of each multicast routing layer 410, 430, 450, etc. to determine, for each multicast group and set of sources at its own layer, the set of entry and exit points to the layer below it. This information is passed to the layer below as a set of source-specific group membership requests, i.e., from the perspective of the layer below, an entry point 630, 680, etc. is a source of multicast traffic, and an exit point 690, 660, etc. is a destination for a group of hosts receiving multicast traffic. Multicast group memberships are initiated at the topmost layer 410 by means of IGMP group membership reports from user hosts 620 to their designated multicast router 625, and from thence to the appropriate routers by means of the top layer 410 multicast routing protocol. On these routers, multicast group information flows down from upper to lower layers. Thus, top layer 410 group memberships determine the middle layer 430 group memberships, and middle layer 430 group memberships determine low bandwidth layer 450 group memberships. Group memberships may also be initiated at the middle layer 430. It should be understood that the direction of group membership information flow, from top layer 410 to bottom layer 450, is the opposite of the direction of network topology information flow, which originates in layer 450, and flows through layer 430 to top layer 410.

II.A.1. Layer Address Spaces

Each layer 410, 430, and 450 has its own independent address space for both unicast and multicast addresses. The low bandwidth layer 450 address space is able to represent the addresses of all low bandwidth routers belonging to a single low bandwidth sub-network 530, but cannot represent arbitrary middle layer 430 IP addresses. Likewise, the middle layer 430 address space is able to represent the addresses of all middle layer 430 IP routers, but cannot represent arbitrary top layer 410 IP addresses. This isolation of top layer 410 and middle layer 430 IP addresses is important in embodiments enforcing security protocols requiring that top layer 410 IP addresses are not be visible in unencrypted form at the middle layer 430, use of such security protocols in a top layer 410 being a significant reason why some embodiments interpose a middle layer 430 between a top layer 410 a low bandwidth layer 450. Consequently, it is to be understood that it is necessary to perform both unicast and multicast address translation between layers 410, 430, and 450.

Distinct multicast addresses at each layer should generally map to distinct multicast addresses at the layer below. Otherwise, the group membership for the lower layer must be the union of the group membership required for each of the corresponding upper-layer multicast addresses. Those skilled in the art will thus recognize that, unless the group memberships are very similar, a failure to map distinct multicast addresses at each layer will result in inefficient traffic flows.

Further, if there are multiple top layer 410 networks 510 layered over a single middle layer 430 network 520, as shown in FIG. 5, then each of the networks 510 has its own independent unicast and multicast address space as well. Top layer 410 multicast addresses from each network 510 should usually (but need not) map to distinct middle layer 430 multicast addresses. Otherwise, then again the group membership for the lower layer 430 must be the union of the group membership required for each of the corresponding upper-layer 410 multicast addresses, leading to less-efficient traffic flows.

It is important to emphasize that, in order to support arbitrary network topologies, a full multicast routing mechanism is required at each of layers 410, 430, and 450. Because group memberships at lower layers are determined by those at higher layers, it might seem as if lower layers could regenerate this information wherever they needed it and, hence, as if full multicast routing is were not required at each layer. Unfortunately, this is not the case. Due to the way in which protocols such as PIM function, information as to group memberships is generally only available at the exit router from a lower-layer sub-network, whereas lower-layer multicast routing requires this information at intermediate routers as well. Due to redundant JOIN/PRUNE suppression, one node does not actually know whether or not another is, or is not, a member of a particular group.

Conversely, lower layer multicast routing protocols do not normally carry enough information to reconstitute higher layer routing information at the network edges, because IP reverse-shortest-path multicast routing algorithms require knowledge of the multicast source which may not even be contained within the lower-layer network and is not the same as the source (i.e., entry point) as seen by the lower layer. Further, were the upper layer to attempt to reconstitute the identity of the source from lower layer information, mistakes leading to routing loops would occur in certain topologies. Lower layers have a more restricted view of the network world, and their multicast routing protocols simply do not carry all the information needed to regenerate higher-layer group membership information.

II.A.2. Counting Hops in a Multi-Layer Network Environment

As illustrated by FIG. 6, each network 510 IP hop may actually correspond to one or more network 520 IP hops, and each network 520 IP hop may actually correspond to one or more low bandwidth network 530 hops. These correspondences have important ramifications for multicast routing. Certain IP multicast groups are defined to have scope local to a particular network 510, 520, 530, etc., so that data sent to these groups is never to traverse more than a single hop. The notions of "network", "hop", and "forwarding" in this definition are always relative to the current layer, even though a single hop at the current layer may actually combine multiple hops at a lower layer.

For instance, a single hop at the top IP layer 410 may actually involve multiple hops at the middle IP layer 430. For example, top layer 410 multicast traffic sent out over a particular top layer 410 IP interface to a group having IP addresses in the range 224.0.0.1 through 224.0.0.255 could be received by all top layer 410 routers on the top layer 410 network attached to that interface that were no more than one top layer 410 IP hop distant, no matter how many middle layer 430 hops away they may be.

Similarly, a single hop at the middle IP layer 430 may actually involve multiple hops at the low bandwidth layer 450; and middle layer 430 multicast traffic sent to a group having IP addresses in the range 224.0.0.1 through 224.0.0.255 could be received by all middle layer 430 routers no more than one middle layer 430 hop distant, no matter how many low bandwidth layer 450 hops away they may be.

It is also quite common to limit the distribution range of multicast traffic through use of the IP time-to-live field in the multicast packet. Although the time-to-live field is supposed to be measured in seconds, IP also requires that the time-to-live field be decremented by at least one for each network hop traversed. Again, the definition of a hop is always relative to the current layer, so that an IP packet with a time-to-live of two would travel no more than two top layer 410 IP hops no matter how many middle layer 430 IP hops or low bandwidth layer 450 hops it might traverse in the process. Nevertheless, if it will take more than a second for the packet to traverse a lower layer network 520 or 530, then according to the IP specification the time-to-live should be reduced by the actual transit time in seconds.

II.B. Multicast Protocol Interoperability

M-PIM provides no special support for interoperability other than for interoperation of M-PIM-DM with PIM-DM, and M-PIM-SM with PIM-SM. Only such interoperability as is inherited naturally from PIM, or which falls out naturally from the protocol design, is provided.

There are three forms of interoperability to be considered: (1) Simultaneous, independent use of different multicast routing protocols for different multicast groups; (2) Inter-network interoperability, employing one multicast protocol on one network and a different multicast protocol for the same group(s) on another network; and (3) Inter-layer interoperability, employing one multicast protocol at one layer and a different multicast protocol for the corresponding multicast group(s) at another layer.

Using different multicast routing protocols for different multicast groups poses no intrinsic difficulties. Indeed, PIM-DM and PIM-SM as presently known are often used this way. This capability can be, and is, preserved by the M-PIM protocol. While M-PIM-DM and M-PIM-SM do involve distinct processing, the distinction can always be made on a group-by-group basis.

The possibilities for inter-network interoperability are specified by D. Thaler, RFC 2715, "Interoperability Rules for Multicast Routing Protocols," October 1999, published by the Internet Society of Reston, Va., available on the world wide web, and incorporated by reference herein in its entirety. Those skilled in the art will recognize that various multicast routing protocols differ radically in their mode of operation and the types of information they carry, and that therefore the possibilities for interfacing are limited and far from fully transparent. M-PIM supports all PIM-DM and PIM-SM message types needed to support such interoperability as specified by RFC 2715. The primary concern, is the need to support the (*,*,RP) messages needed to bridge PIM-SM to dense mode protocols. It should be understood, however, that bridging PIM-SM to PIM-DM or other dense-mode protocols forces every PIM-SM router along the route between the bridging router and the rendezvous-point(s) for the bridged groups to relay traffic for every group along that path, with potentially deleterious impact upon network load. Thus, extensive bridging of PIM-SM to PIM-DM is not recommended.

The possibilities for inter-layer interoperability are also somewhat limited, and not all combinations are practicable. The protocol design presented here will, however, allow software to support all possible combinations of M-PIM-DM and M-PIM-SM: M-PIM-DM over M-PIM-DM, M-PIM-DM over M-PIM-SM, M-PIM-SM over M-PIM-DM, and M-PIM-SM over M-PIM-SM (note, however, that M-PIM-DM over M-PIM-SM is practicable only when the upper layer network is much smaller than the lower layer network, and that M-PIM-SM over M-PIM-DM probably never makes much sense).

Finally, RFC 3618, "Multicast Source Discovery Protocol (MSDP)," incorporated by reference herein above, describes an extension to PIM-SM, MSDP, which can be used to support multiple rendezvous points either within a single network or in different networks, and which therefore permits PIM-SM to serve as an inter-network routing protocol. M-PIM contains no special support for MSDP, but is compatible with it.

III. M-PIM Implementation Details

III.A. Neighbor Discovery and Hello Suppression

Those skilled in the art will recognize that routers configured under PIM, as presently known, use HELLO messages to determine which PIM router is the DR (i.e., designated router as described in the PIM specification) with respect to a particular network interface. As is known, HELLO messages contain information that allow the interface to evaluate neighboring routers and to elect a DR from the neighboring routers. However, by assuming that every router on a network 530 supports M-PIM, HELLO messages become unnecessary. An interface can identify neighbor routers from a conventional IP unicast forwarding table by looking for route entries with the RTF_GATEWAY flag set and the gateway address set to the IP interface address of the current router providing the interface to the network 530. Accordingly, an interface router in a network 530 may identify new neighbors and former neighbors either by scanning the IP unicast forwarding table periodically, or, preferably, by monitoring changes to the IP forwarding table through a routing socket or equivalent.

Besides serving to identify neighboring PIM routers, PIM HELLO messages carry only one other piece of optional information: the neighbor HoldTime. This parameter is meaningless when neighbors are discovered through the IP unicast forwarding table in the manner just described, and may be ignored.

III.B. Interlayer Control of Group Memberships

Figure 7:
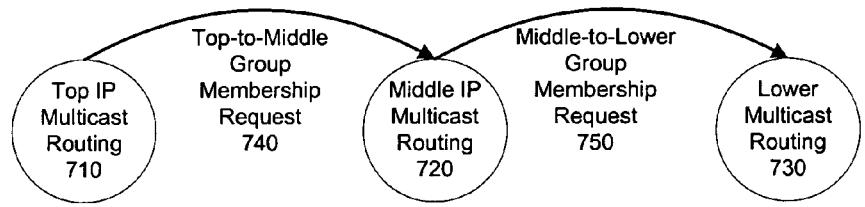
FIG. 7 is a block diagram showing the generation and processing of inter-layer group membership requests on multi-hop network interfaces, illustrating the flow of group membership requests from upper to lower layers, according to an embodiment.

FIG. 7 is a block diagram showing the generation and processing of inter-layer group membership requests on multi-hop network interfaces, illustrating the flow of group membership requests from upper to lower layers. Top IP multicast routing 710 represents the routing in a top layer 410. Middle IP multicast routing 720 represents the routing in a middle layer 420. Low bandwidth IP multicast routing 730 represents the routing in a low bandwidth layer 430. Membership requests 740 and 750 flow from higher layers to lower layers. Note that the communications mechanisms employed for transmitting inter-layer group membership requests, which are properly part of the network software architecture, which those skilled in the art will recognize could be implemented in a variety of ways. Accordingly, inter-layer group membership messaging is described herein in terms of requested state changes, without specifying the mechanisms by which those state changes are induced.

Figure 8:
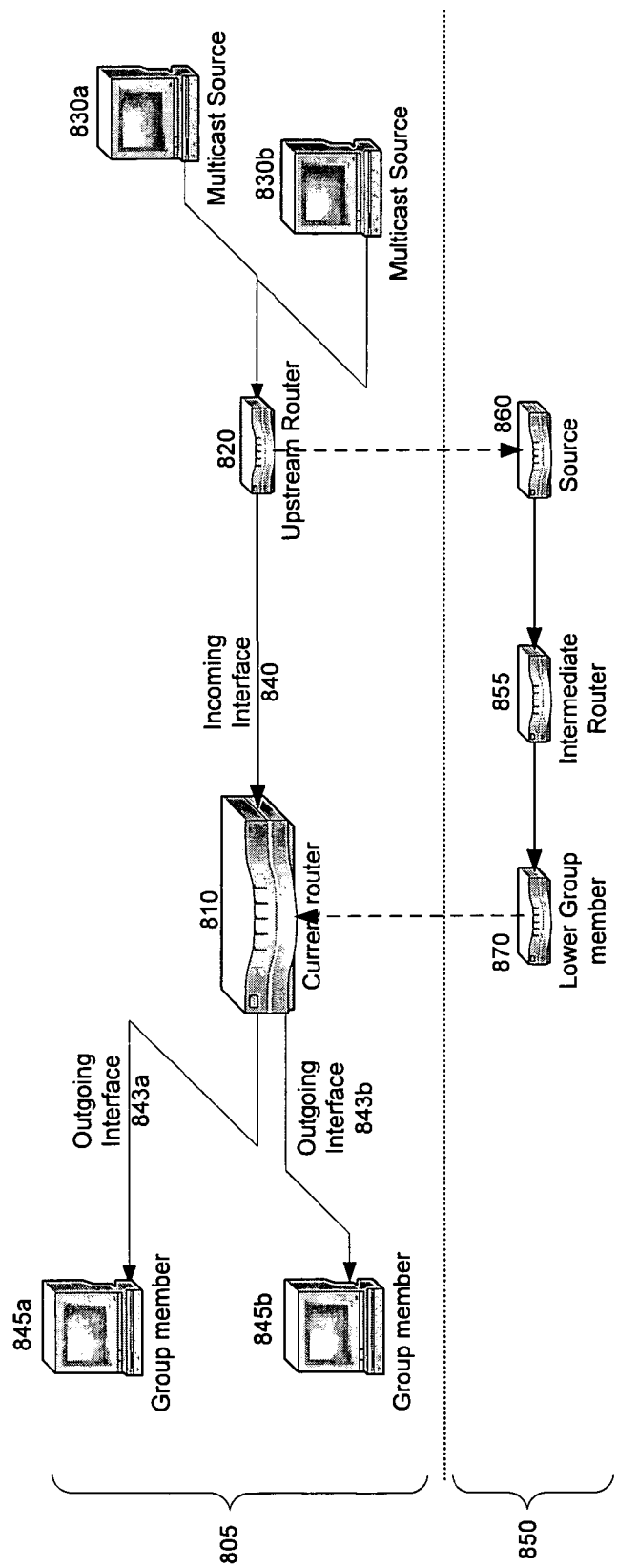
FIG. 8 is a network diagram showing interlayer control of group memberships from the viewpoint of a particular router at a current network layer, according to an embodiment.

FIG. 8 is a network diagram showing interlayer control of group memberships from the viewpoint of a particular router at a current layer 805, i.e., current router 810. Momentarily referring back to FIGS. 4-6, it should be understood that the layer 805 could correspond to either of layers 410 or 430. Upstream router 820, sometimes denoted "U", provides current router 810 with multicast traffic for a group 845, sometimes denoted "G", from a particular source 830. This incoming multicast traffic is received via incoming interface 840. Current router 810 forwards multicast traffic to reach the multicast group destinations 845 via an outgoing interface 843. Current router 810 maintains a table, such as Table 1 discussed above, indexed by multicast source 830, sometimes denoted "S", and group 845, this table containing state information for each (S, G) pair, such state information being known as (S, G) state. Those skilled in the art will recognize that (S, G) state information is known with respect to PIM.

Each hop at the current layer corresponds to a traversal of a lower-layer network 850, the traversal of the lower layer 850 being possibly many hops long, i.e., though one or more intermediate routers 855. The upstream router 820 at the current layer 850 becomes the lower layer 850 multicast source 860, sometimes denoted "$S_{lower}$". The lower layer 850 needs to know, for each multicast source 860 and group 870, whether or not a destination should belong to group 870, sometimes denoted "$G_{lower}$," for lower layer 850 source 860. Inasmuch as each lower-layer 850 source 860 corresponds to an upstream router 820 at the current layer 805, and each lower-layer 850 group 870 corresponds to a group 845 at the current layer 805, the current router 810 at the current layer 845 must determine for each (U, G) pair (e.g., upstream router 820 and group 845) whether or not to join ($S_{lower}$, $G_{lower}$) at the lower layer.

III.B.1. Generating Group Membership Requests for Lower Routing Layers

In order to provide the support for layered networks described above, it is necessary to generate group membership requests for use by lower layers, e.g. layers 430 or 450 shown in FIG. 4, or layer 850 shown in FIG. 8, on all multi-hop, multi-access interfaces. This information is generated at the exit routers from the lower-layer network, e.g., exits routers 660, and 690 shown in FIG. 6. Each router at the current layer 805 must determine if it is to be an exit router for a particular group 845, and upstream router 820, and pass that information down to a lower layer 850. Further, all group membership requests to lower layers 850 are source specific:

that is, they are requests to join a group 845 for a specific upstream router 820. From the viewpoint of the lower-layer 850 routing protocol, upstream router 820 is the multicast source 860.

From the standpoint of routers in current layer 805, multicast group membership state is indexed according to group 845 and upstream router 820, corresponding to a distinct group 870, i.e., a group $G_{lower}$, and lower-layer 850 source 860. This multicast group membership state will be represented by M(U,G), and must be computed from the known PIM (S,G) state, indexed by Source S and Group G.

As mentioned above, each group 845 at the current layer 805 corresponds to a distinct group 870 at the layer below. However, the paths from several different sources, e.g., sources 830a and 830b shown in FIG. 8, may pass through the same upstream router 820. Hence, several sources 830 at the current level 805 may correspond to a single upstream router 820, and therefore to the same multicast source 870. It is necessary to compute the desired membership state M(U,G) for each upstream router 820 and group 845 from the (S,G) state information for all sources 830 from which a route to some member of group 845 passes through an upstream router 820. This membership state is distinct from, and must not be confused with, the standard PIM (S,G), (*,G), and (*,*,RP) state, which a current router 810 also maintains for each interface 840.

A possible (S,G) state and corresponding M(U,G) state table for the network fragment of FIG. 8, for the simple case where PIM-DM is employed as the routing table, is shown in Table 4 below. It should be noted in particular that each M(U,G) state entry corresponds to multiple (S,G) state entries, one for each source reached through upstream router 820. Those skilled in the art will recognize that, for PIM-DM, the M(U,*,DM) state is always NON-MEMBER, so the membership status may be either MEMBER or DEFAULT.

received via upstream router 820; it can assume the values MEMBER or NON-MEMBER. The M(U,G) state indicates whether the interface belongs to the specific group G, e.g. group 845, for traffic received from U, e.g. upstream router 820; if the M(U,*,PROTO) state is NON-MEMBER then M(U,G) state can have the values DEFAULT (=NON-MEMBER) or MEMBER, and if the M(U,*,PROTO) state is MEMBER then M(U,G) state can have the values NON-MEMBER or DEFAULT (=MEMBER).

Group JOIN/PRUNE requests from a current router 810 to a lower layer 850 are triggered by changes to these M(U,G) and/or M(U,*,PROTO) membership states. Depending upon the communications mechanism used, current router 810 may also periodically refresh group JOIN/PRUNE requests to a lower layer 850 even though the M(U,G) and/or M(U,*,PROTO) membership states remain unchanged. Whatever communications mechanism is used must ensure that the M(U,G) and M(U,*,PROTO) state stored in the current layer 805, i.e., by current router 810, remain synchronized with the actual group membership at the lower layer 850, except possibly for short-lived transients while the membership state is changing. Synchronization must be maintained even across re-starts of multicast routing at either the current layer 805 or the lower layer 850. Maintenance of synchronization can be accomplished, for example, by use of a reliable communications mechanism between current layer 805 and a lower layer 850, or by a periodic refresh of membership state by the current layer 805 accompanied by eventual time-out of stale information by the lower layer 850. Various mechanisms for communications between a current layer 805 and a lower layer 850 are known to those skilled in the art, and the precise communications mechanism used is a matter of software design that is outside the scope of this specification of the M-PIM protocol itself.

TABLE 4

| (S, G) State | | | | M(U, *, DM[PROTO]) state | | M(U, G) state | | |
|---|---|---|---|---|---|---|---|---|
| Inc. Interface | Source | Group | Outgoing Interfaces | Upstream Router | Membership Status | Upstream Router | Group | Membership Status |
| 840 | 830a | 845a | 850a, 850b | 820 | NON-MEMBER | 820 | 845a | MEMBER |
|  | 830b | 845a | 850a, 850b |  |  |  |  |  |
|  | 830a | 845b | None |  |  | 820 | 845b | DEFAULT |
|  | 830b | 845b | None |  |  |  |  |  |
|  | 830c (not shown) | 845a | 850a, 850b | 820a (not shown) | NON-MEMBER | 820a (not shown) | 845a | MEMBER |
|  | 830d (not shown) | 845a | 850a, 850b |  |  |  |  |  |
|  | 830c (not shown) | 845b | none |  |  | 820a (not shown) | 845b | DEFAULT |
|  | 830d (not shown) | 845b | none |  |  |  |  |  |
| 840a (not shown) | ... | ... | ... | ... | ... | ... | ... | ... |

For each incoming interface 840 from a multihop network such as included in lower layer 850, it is necessary to maintain what is referred to in some embodiments as an M(U,*,PROTO) membership state, in addition to an M(U,G) membership state. The M(U,*,PROTO) state specifies a default mode with respect to the interface 840, indicating whether the interface should by default belong to every group for traffic It should be understood that changes in the group membership state M(U,G) are triggered by changes in the (S,G), (*,G), and (*,*,RP) state. These state changes, in turn, can be triggered by a variety of events, as documented in RFC 2362 for PIM-SM and in the PIM-DM draft, both incorporated by reference herein above. Such events include receipt of PIM JOIN/PRUNE messages, changes in IGMP group membership state on directly-attached IP interfaces, changes in group membership by local applications, changes in the unicast routing topology, and others. It is important to note, however, that these events do not trigger changes in group membership requests directly, but only through the intermediary of (S,G), (*,G), and (*,*,RP) state changes.

Since more than one multicast source 830 can map to the same upstream router 820, the membership state M(U,G) maintained by a current router 810 must also include a count of the number of corresponding (S,G), (*,G), and (*,*,RP) entries. This count may be maintained by incrementing or decrementing a counter in response to (S,G) state changes, or it may be implicit in the current (S,G) state itself. In present embodiments, current router 810 changes its M(U,G) state to MEMBER (or DEFAULT) when this count becomes greater than zero, and changes it to DEFAULT (or NON-MEMBER) when the count returns to zero again.

When layer 805 is using PIM-DM, the rules for determining membership state M(U,G) from (S,G) are fairly straightforward, since PIM-DM does not use the (*,G) or (*,*,RP) states. Since in PIM-DM it is assumed that, by default, every router is a member of every group, it can also be assumed that M(U,*,PROTO) state is always MEMBER for every possible upstream router 820, and never changes. The possible values of M(U,G) state are then DEFAULT (=MEMBER) and NON-MEMBER. M(U,G) is set to NON-MEMBER if the (S,G) state for every upstream source 830 corresponding to upstream router 820 consists of a negative cache entry. If the M(U,G) state is NON-MEMBER, then negative group membership information is reported to the lower layer 850; no special action is required when M(U,G) is DEFAULT (=MEMBER).

When layer 805 is using PIM-SM, the procedures for generation of group membership requests to lower layers 850 are much more complicated, inasmuch as PIM-SM must track (*, G) and (*,*,RP) states, as well as the (S,G) state. Changes to the (S,G) and (*,G) states affect the M(U,G) states of the interface 840, where upstream router 820 is the router that is upstream of the current router 810 towards a source S, e.g., a source 830, in the case of changes to the (S,G) state and the upstream router 820 towards the rendezvous-point for group 845 in the case of changes to the (*,G) state. By contrast, changes to (*,*,RP) state primarily affect the M(U,*,SM) state of the interface 840, where U is the upstream router 820 towards rendezvous-point RP. In the absence of (*,*,RP) state, PIM-SM would always operate with M(U,*,SM) state equal to NON-MEMBER, so that M(U,G) state could have the values of MEMBER or DEFAULT; however, establishment of (*,*,RP) state can force PIM-SM to operate in a mode more like PIM-DM, with M(U,*,SM) state equal to MEMBER. In fact, (*,*,RP) state is used primarily to support bridging PIM-SM to PIM-DM and similar reactive dense-mode protocols; it effectively puts all PIM-SM routers along the path to the rendezvous-point into a somewhat PIM-DM like mode. However, changes to (*,*, RP) state also affect the M(U,G) state of the lower interfaces for every G, because changes in M(U,*) state change the interpretation of M(U,G) state.

The rules described here for generating group membership requests to lower layers are sufficient to permit layered operation of PIM-SM over PIM-SM, PIM-DM over PIM-SM, PIM-SM over PIM-DM, and PIM-DM over PIM-DM. However, PIM-SM over PIM-DM makes little operational sense and is not recommended.

With reference to FIG. 8, there is no need for either layer 805 or 850 to explicitly inform the other as to whether PIM-SM or PIM-DM is in use; all necessary information is embedded in messages describing M(U,*,PROTO) state. An upper-layer router 810 employing PIM-DM would inform its lower counterpart router 870 that its M(U,*,PROTO) is MEMBER for every known upstream router 820, and send M(U,G) LEAVE messages when appropriate. An upper-layer router 810 employing PIM-SM might have different M(U,*, PROTO) states for each upstream router 820, and could send either M(U,G) LEAVE or JOIN messages correspondingly. The message sent to report M(U,*,PROTO) state must include a list of the groups or range of groups to which it applies.

Table 5 below describes in detail the membership state changes, with respect to group memberships in a lower layer 850, for either PIM-SM or PIM-DM in response to changes in (S,G) state entries. In the action descriptions, "Joining" M(U,G) or M(U,*,PROTO) means changing the M(U,G) or M(U,*,PROTO) state on the interface to MEMBER regardless of its current value, and "Leaving" (U,G) or (U,*) means changing the M(U,G) or M(U,*,PROTO) membership state on the interface to NON-MEMBER regardless of its current value. It is assumed that all M(U,G) states are reset to DEFAULT any time M(U,*,PROTO) state changes.

TABLE 5

| (S, G) State Change | Action |
|---|---|
| Both PIM-DM and PIM-SM | |
| Discover new neighbor U on a multihop router interface 840 | PIM-SM: Initialize source count for M(U,*,SM) on the interface 840 to 0.<br>PIM-DM: Initialize source count for M(U,*,DM) on the interface 840 to 1 and join (U,*) on the interface 840. Initialize the source count for M(U,G) on the interface 840 to 1, for every known group G. |
| Add (S,G) entry with a multihop network as interface 840 (incoming interface) and outgoing interface list<br>Change interface 840 for an existing (S,G) entry with outgoing interface list to a multihop network<br>Add an outgoing interface 843 to a null outgoing interface list for an existing (S,G) entry with a multihop network as interface 840 | Increment source count for M($U_{new}$,G) on the interface 840, where $U_{new}$ is the new upstream router 820 for source S. If source count for M($U_{new}$,G) + source count for M($U_{new}$,*) had been zero, join M($U_{new}$,G) on the interface 840. |
| Delete a (S,G) entry which had had a multihop network as interface 840<br>Change interface 840 for an existing (S,G) away from a multihop network<br>Delete last outgoing interface 843 from the outgoing interface list for an existing (S,G) entry with a multihop network as interface 840 | Decrement source count for M($U_{old}$,G) on the previous interface 840, where $U_{old}$ is the previous upstream router 820 for source S. If source count for M($U_{old}$,G) + source count for M($U_{old}$,*,PROTO) becomes zero, leave M($U_{old}$,G) on the interface 840. |

TABLE 5-continued

| (S, G) State Change | Action |
|---|---|
| Change upstream router 820 for an existing (S,G) with a multihop network as interface 840 and a outgoing interface list | Decrement source count for $M(U_{old},G)$ on the interface 840. If source count for $M(U_{old},G)$ + source count for $M(U_{old},*,PROTO)$ becomes zero, leave $M(U_{old},G)$ on the interface 840. Increment source count for $M(U_{new},G)$ on the interface 840. If source count for $M(U_{new},G)$ + source count for $M(U_{new},*,PROTO)$ had been zero, join $M(U_{new},G)$ on the interface 840. |
| PIM-SM Only | |
| Add (*,G) entry with a multihop network as interface 840 (incoming interface) Change interface 840 for an existing (*,G) entry to a multihop network Add an outgoing interface 843 to a null outgoing interface list for an existing (*,G) entry with a multihop network as interface 840 | Increment source count for $M(U_{new},G)$ on the interface 840, where $U_{new}$ is the new upstream router 820 for group G's rendezvous-point. If source count for $M(U_{new},G)$ + source count for $M(U_{new},*,PROTO)$ had been zero, join $(U_{new},G)$ on the interface 840. |
| Delete a (*,G) entry which had had a multihop network as interface 840 Change interface 840 for an existing (*,G) away from a multihop network Delete last outgoing interface 843 from the outgoing interface list for an existing (S,G) entry with a multihop network as interface 840 | Decrement source count for $M(U_{old},G)$ on the previous interface 840, where $U_{old}$ is the previous upstream router 820 for group G's rendezvous-point. If source count for $M(U_{old},G)$ + source count for $M(U_{old},*,PROTO)$ becomes zero, leave $(U_{old},G)$ on the interface 840. |
| Change upstream router 820 for an existing (*,G) with a multihop network as interface 840 and a outgoing interface list | Decrement source count for $M(U_{old},G)$ on the interface 840. If source count for $M(U_{old},G)$ + source count for $M(U_{old} *,PROTO)$ becomes zero, leave $M(U_{old},G)$ on the interface 840. Increment source count for $M(U_{new},G)$ on the interface 840. If source count for $M(U_{new},G)$ + source count for $M(U_{new},*,PROTO)$ had been zero, join $M(U_{new},G)$ on the interface 840. |
| Add (*,*,RP) entry with a multihop network as interface 840 (incoming interface) Change interface 840 for an existing (*,*,RP) entry to a multihop network Add an outgoing interface 843 to a null outgoing interface list for an existing (*,*,RP) entry with a multihop network as interface 840 | Increment source count for $M(U_{new},*,PROTO)$ on the interface 840, where $U_{new}$ is the new upstream router 820 for rendezvous-point RP. If source count for $M(U_{new},*,PROTO)$ had been zero, then do the following in the order described: <br> 1. Join $M(U_{new},*,PROTO)$ on the interface 840. <br> 2. Re-evaluate source count for $M(U_{new},G)$ + source count for $M(U_{new},*,PROTO)$ for every known group G. If source count for $M(U_{new},G)$ + source count for $M(U_{new},*,PROTO)$ <1, leave $M(U_{new},G)$ on the interface 840. |
| Delete a (*,*,RP) entry which had had a multihop network as interface 840 Change interface 840 for an existing (*,*,RP) away from a multihop network Delete last outgoing interface 843 from the outgoing interface list for an existing (S,G) entry with a multihop network as interface 840 | Decrement source count for $M(U_{old},*,PROTO)$ on the previous interface 840, where $U_{old}$ is the previous upstream router 820 for rendezvous-point RP. If source count becomes zero, then do the following in the order described: <br> 1. Leave $M(U_{old},*,PROTO)$ on the interface 840. <br> 2. Re-evaluate source count for $M(U_{old},G)$ + source count for $M(U_{old},*,PROTO)$ for every known group G. If source count for $M(U_{old},G)$ + source count for $M(U_{old},*,PROTO)$ <1, leave $M(U_{new},G)$ on the interface 840. |
| Change upstream router 820 for an existing (*,*,RP) with a multihop network as interface 840 and a outgoing interface list | Decrement source count for $M(U_{old},*,PROTO)$ on the interface 840. If source count for $M(U_{old},*,PROTO)$ becomes zero, then do the following: <br> 1. Leave $M(U_{old},*,PROTO)$ on the interface 840. <br> 2. Re-evaluate source count for $M(U_{old},G)$ + source count for $M(U_{old},*,PROTO)$ for every known group G. If source count for $M(U_{old},G)$ + source count for $M(U_{old},*,PROTO)$ <1, leave $M(U_{new},G)$ on the interface 840. <br> Increment source count for $M(U_{new},*,PROTO)$ on the interface 840. If source count for $M(U_{new},G)$ had been zero, then do the following: <br> 1. Join $M(U_{new},*,PROTO)$ on the interface 840. <br> 2. Re-evaluate source count for $M(U_{new},G)$ + source count for $M(U_{new},*,PROTO)$ for every known group G. If source count for $M(U_{new},G)$ + source count for $M(U_{new},*,PROTO)$ <1, leave $M(U_{new},G)$ on the interface 840. |

III.B.2. Processing Group Membership Requests Received from Upper Routing Layers When M-PIM is employed in a layered architecture at a layer below an upper network layer 805 as disclosed herein, M-PIM routers at lower layers 850, etc. must be able to accept group membership requests from the upper layer. Such requests, when generated by a higher layer 805 are always source specific. However, non-source-specific group membership requests can be received if a local application at an upper layer 805 joins a group on a lower layer 850 interface directly.

It should be seen that, from the viewpoint of the lower layer 850, the upper layer 805, etc. "looks" much the same as would a point-to-point interface to an external host. The upper layer 805, etc. has its own IP address, which plays essentially the same role as the address of an external host. Packets destined for the upper layer specify that address as its IP destination.

Group membership requests received from the upper layer 805, etc. that are non-source-specific have the same effect as would IGMP version 1 and version 2 group membership reports received from an external host with the same IP address as the upper layer 510, 805, etc. This behavior is specified for PIM-SM in RFC 2362§2.1 and §3.2.1, and the corresponding sections of the IETF's 1997 PIM-DM draft, both incorporated by reference herein above. Essentially, for PIM-SM, an active IGMP group membership (or upper-layer membership) results in creation of an (*,G) state entry for the group G, which includes the IP interface to the group member (or upper layer) in its outgoing interface list. This state entry, in turn, may trigger generation of JOIN messages towards the rendezvous-point for G. For PIM-DM, any negative (S,G) state entries for the group G are cancelled; this results in a cessation of PRUNE messages.

Source-specific group membership requests received from the upper layer have the same effect as would an IGMP version 3 group membership report received from an external host with the same IP address as the upper layer. Allowing a destination to join a group while specifying that it will receive traffic only from a particular source is specified for PIM-SM in IETF draft revised specifications for PIM-SM, such as Section 3, "Source Specific Joins", and passim of Bill Fenner et al., "Protocol Independent Multicast-Sparse Mode (PIM-SM): Protocol Specification (Revised)," draft-ietf-pim-sm-v2-new-07, March 2003, published by the IETF, fully incorporated by reference herein in its entirety. Similar behavior does not appear to have been formally specified as of yet for PIM-DM, but the same approach can be used. It should be noted, however, that actual support for IGMP version 3 by routers at lower layers 850, etc. is not currently required.

A PIM-SM router, e.g., a current router 810, creates (S,G) state in response to a source-specific group membership report for source S and group G, which may in turn trigger PIM JOIN messages towards source S. No (*,G) state is created or modified, and so the rendezvous-point mechanism of PIM-SM, known to those skilled in the art, is bypassed entirely. Accordingly the necessary actions for responding to a source specific group membership report thus invoke just a subset of standard PIM-SM as specified by RFC 2362, incorporated herein by reference above. No extensions to the PIM-SM protocol are required to support source-specific group memberships, and so strict compatibility with standard Open Shortest Path First (OSPF) protocol as specified by RFC 2362 is maintained.

A request to join or leave (S,*) is handled as a degenerate case of a (S, G) membership request, by creating an (S,G) entry with the group ID G set to 0 and a group address mask length of 0. If the upper layer 805 is restricted to using a limited Classless Inter-Domain Routing (CIDR) range of lower layer multicast addresses, then a request to join or leave (S, *) should instead be handled by creating an (S,G) entry with the group ID G set to the prefix for the CIDR range and the group address mask set to the appropriate length for the CIDR range. However, it should be noted that support for CIDR aggregates of multicast groups requires an extension to PIM-DM on the lower layer that may not be compatible with existing PIM-DM routers. Multiple CIDR ranges not amenable to aggregation can be handled by creating multiple (S,G) entries, one for each range. Likewise, if strict compatibility with standard PIM-DM is required at the lower layer, multiple (S,G) entries can be used, one for each group in the range. In order to implement the lower-layer state machine discussed above with reference to Table 5, all (S,G) join or leave states should be reset any time an (S, *) join or leave is received.

PIM-DM routers behave very similarly. Again, (S,G) state is created in response to a source-specific group membership report (or upper layer membership report) for source S and group G, which may result in suppressing PIM PRUNE messages towards source S. A request to join or leave (S,*) is likewise handled by setting the CIDR prefix and mask length appropriately for the range of group IDs available for use by the upper-layer protocol.

When two layers, e.g., a top layer 410 and a middle layer 430 are separated by a security protocol, it is also possible for the middle layer 430 to receive an error indication from the security protocol indicating that it was unable to decrypt an incoming packet. Such situations are particularly likely when using PIM-DM at the middle layer 430, because under PIM-DM, all routers are presumed by default to belong to all groups unless explicitly pruned. It is thus quite likely that a PIM-DM router would receive user traffic destined for groups that the security protocol does not know about, and hence cannot decrypt. However, error indications can also occur in PIM-SM if (S,*) membership has been requested by the upper layer.

Error indications such as described above can be handled as follows. Because an incoming packet that cannot be decrypted by a security protocol will not be passed to the upper layer 410, the upper layer 410 will not be able to generate an (S,G) LEAVE request for the group. For this reason, the middle layer 430 should interpret the error indication from the security protocol as the equivalent of an (S,G) LEAVE request. Because the error indication should contain the middle layer 430 header of the undecipherable packet, the middle layer 430 should be able to determine the relevant source S and group G from this header information.

It will be noted that the rules described here for processing group membership requests from upper layers are sufficient to permit layered operation of PIM-SM over PIM-SM, PIM-DM over PIM-SM, PIM-SM over PIM-DM, and PIM-DM over PIM-DM. However, as noted above, the layering of PIM-SM over PIM-DM makes little operational sense and is not recommended.

III.C. Join/Prune Suppression

Optional JOIN/PRUNE suppression, as specified for PIM-SM by RFC 2362§2.9, incorporated herein by reference above, is generally essential to permit scaling to large low bandwidth networks and is thus preferably mandatory in embodiments disclosed herein, which provide examples of such low bandwidth networks. Although the PIM-DM specifications make no explicit mention of an equivalent mechanism for PIM-DM, the same mechanism specified for PIM-SM in RFC 2362§2.9 can be employed by PIM-DM as well and is mandatory in PIM-DM environments.

For PIM-SM, the procedure for JOIN/PRUNE suppression is modified slightly so as to eliminate the need for separate ASSERT messages as discussed below.

III.D. Resolving Multiple Entry Points and Assert Optimization

Figure 9:
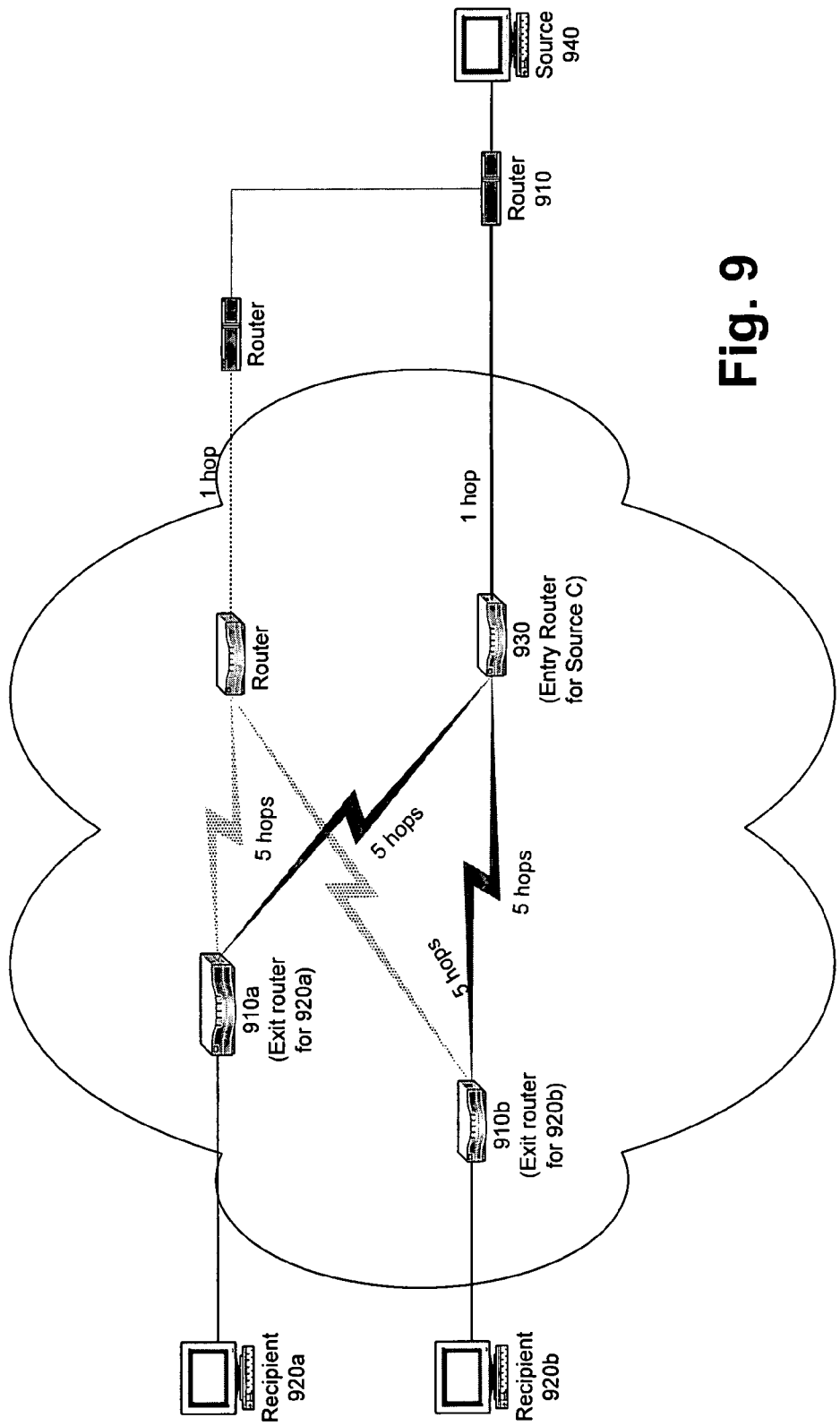
FIG. 9 is a network diagram showing the election of a single entry point to a network via the reverse-shortest-path rule, according to an embodiment.

Those skilled in the art will recognize that entry points to a network for a multicast source may be chosen by a variety of mechanisms. For example, when the cost between every pair of routers on a single multi-access network is the same, every exit point from the network will compute, using reverse-shortest-path rules known to those skilled in the art, the same entry point for each source. Thus, the combined effect of the reverse-shortest-path rules at the exit points from the network, and PIM JOIN/PRUNE messages generated as a result, is to elect a single, common entry point to the network for each group and source, as shown in FIG. 9, which illustrates the election of a single entry point via the reverse-shortest-path rule. Such an election of entry points is the norm for a multi-access network, such as an Ethernet.

As illustrated by FIG. 9, the exit routers 910a and 910b for recipients 920a and 920b select the same upstream router 930 as the entry router for source 940, because it is the "next hop" on the shortest path back to the source 940 from each of recipients 920a and 920b. When the cost between every pair of routers on the network is the same, the reverse-shortest-path-rule applied at the exit routers 910a and 910b automatically results in the selection of a single entry router 930 for each source.

Figure 10:
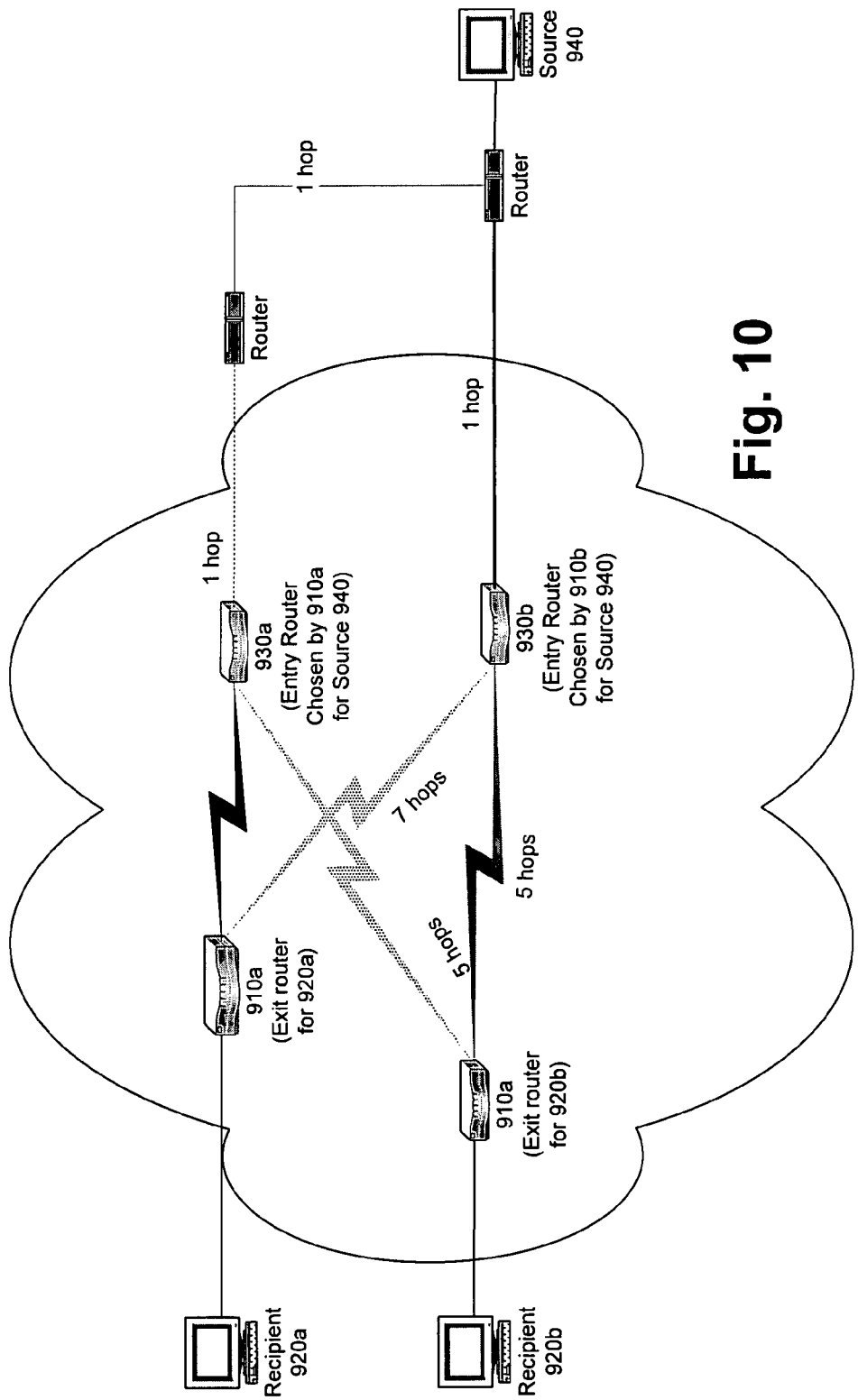
FIG. 10 is a network diagram showing how the reverse-shortest-path rule may result in the choice of different entry points by a plurality of recipients even though the same multicast traffic source serves all recipients, according to an embodiment.

In a low bandwidth network, however, the cost between every pair of routers may be different, and the model discussed above with respect to FIG. 9 thus may not apply. When the cost between each pair of routers may be different, it is no longer the case that exit routers will elect a single entry point to the multi-access network through the automatic effect of the reverse-shortest-path rule. Instead, as is illustrated in FIG. 10, the reverse-shortest-path rule may result in the choice of different entry points by each recipient 920a, 920b, etc., even though the same multicast traffic source 940 serves all recipients 920a, 920b, etc. Exit routers 910a and 910b for recipients 920a and 920b respectively each select different upstream routers 930a and 930b as the entry points for source 940, because each finds a different upstream router 930a or 930b to be the "next hop" on the shortest path back to the source 940.

Election of multiple entry points is not necessarily a problem, provided that the lower network layer 520, 530, 850, etc. supports source-specific group memberships properly and the network's data paths are widely separated in radio space. However, if the lower network layer 520, 530, 850, etc. does not support source-specific group membership, duplicate traffic will flow through the lower network layer 520, 530, 850, etc. from router 930b to router 920a, and from router 930a to router 910b.

Figure 11:
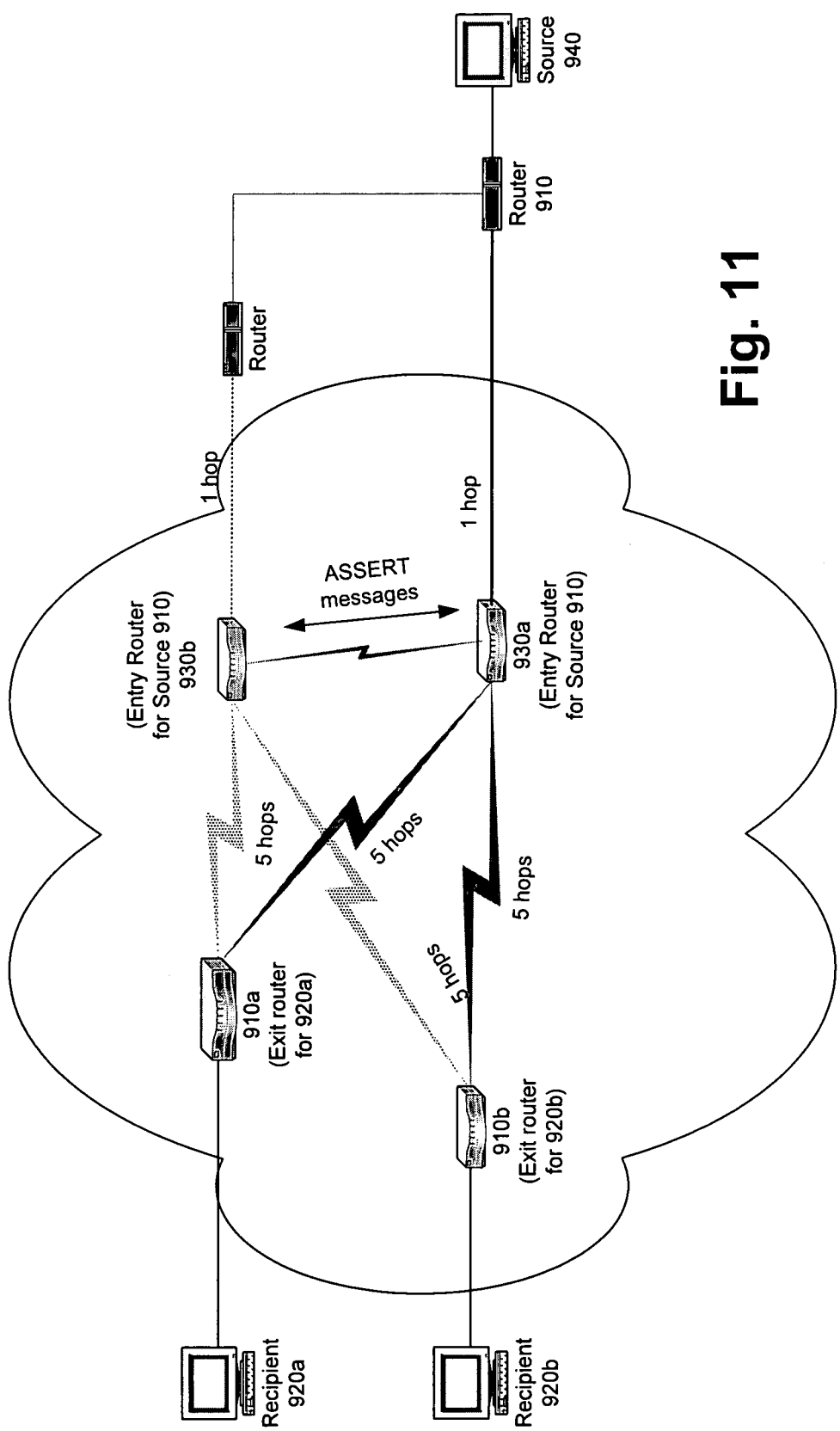
FIG. 11 is a network diagram showing the election of a single entry point to a network for a multicast source via ASSERT messages, as enforced by PIM, according to an embodiment.

As is known, PIM is designed to enforce the election of a single entry point for each multicast source on a network. FIG. 11 illustrates the election of a single entry point for a multicast source via ASSERT messages, as enforced by PIM. If automatic election of a single entry point 930 by means of the reverse-shortest-path rule (as discussed with respect to FIG. 9) breaks down (as discussed with respect to FIG. 10), multiple entry points 930a, 930b, etc. will elect one of themselves as the preferred entry point 930 through the exchange of ASSERT messages, as discussed, e.g., ASSERT messages among themselves as described in RFC 2362 (e.g., §3.5), incorporated herein by reference above. As those skilled in the art will understand, the exit routers 910 listen in on these ASSERT messages and change their designation of an upstream router accordingly. In this special case, therefore, the upstream router may differ from the shortest-path "next hop" towards the source 940.

Election of a single entry point is essential in PIM-DM, and in PIM-SM if the lower routing layer, e.g., 530 or 850, does not support source-specific group membership. Otherwise, each entry point 930 will inject a separate copy of the multicast traffic originating at the relevant source 940 into the network, multiple copies of the multicast traffic will flow through the network, and multiple copies of the multicast traffic will be received at each exit point 910. While the reverse-shortest-path rule applied at an exit point 910 will accept only one of these copies of the multicast traffic, resolving the duplication, multiple copies will in the meantime have flowed through the network, wasting valuable bandwidth.

The necessity of electing a single entry point is much less clear, however, when the network uses PIM-SM and the lower routing layer, e.g., 530 or 850, does indeed support source-specific group membership. In that case, exit router 910a would join the relevant group only for traffic injected at entry router 930b, and likewise exit router 910b would join the relevant group only for traffic injected at entry router 930a. In this case, there would not be any redundant flows. If the paths to each exit point 910 from its corresponding upstream router do not pass within interference range of each other, this might even be a more efficient traffic pattern than the single-entry-point pattern discussed with respect to FIG. 9. But if the flows do pass within interference range of each other, then the interfering routers effectively end up carrying duplicate messages that might have been avoided in the single-entry-point traffic flow pattern. Hence, depending upon the location of the exit points and their corresponding upstream routers on the radio network and the internal topology of the radio network, it might or might not be beneficial to elect a single preferred entry point under PIM.

Unfortunately, the standard PIM ASSERT mechanism does not scale well to large multi-hop radio networks. As explained above, ASSERT messages scale more poorly than JOIN/PRUNE messages by a factor proportional to the number of distinct entry points computed by the reverse-shortest-path algorithms for each source. When R-OSPF is used as the unicast routing protocol, the unicast cost may be different between each pair of routers, and so the reverse-shortest-path algorithms may select a large number of different entry points. Thus, it is the load from ASSERT messages, not the load from the JOIN/PRUNE messages that form the heart of the PIM protocol, that would become the limiting factor on a multi-hop radio network.

Even worse, the M-PIM source-specific multi-layer support breaks the standard PIM ASSERT mechanism for resolving multiple entry points. In standard PIM, each router belongs to every multicast group. Consequently, any router injecting user traffic for a group G can monitor that group as well. If it receives on its outgoing interface any user traffic for a group G and source S for which it believes the shortest path does not lie through that interface, it starts sending ASSERT messages. However, when M-PIM multi-layer group support is employed, a router belongs only to those groups for which it has so configured the lower layer of the interface. An upstream router injecting traffic for a group G would not necessarily itself belong to G on the outgoing interface, and so cannot readily monitor that group. Moreover, the router would not necessarily know the identity of the other possible entry points for group G, and so could not set up the necessary group membership request to lower layers without joining group G for every source. Even in M-PIM-DM, it is possible for a router injecting traffic for a group G to remove itself from that group, if it were not needed to forward multicast traffic to the same group in the opposite direction.

It is clear, therefore, that in order to support multi-hop low bandwidth networks, a different approach to election of a preferred entry point is required both for PIM-SM and for PIM-DM. Unfortunately, different mechanisms are needed for each.

III.D.1. Exemplary Modification of PIM-SM for Entry Point Election

In PIM-SM, it should be possible to obtain good results by choosing arbitrarily any one from among a set of entry points 930 computed by the reverse-shortest-path algorithm at each exit point 910, as long as the same procedure is applied at every router in a network so that every router makes the same choice. Those skilled in the art will recognize that the reverse-shortest-path algorithms guarantee that every router in the set of candidate entry points is along the shortest path from some exit point back to the multicast source, and so any one of them should be a reasonable choice. In fact, it is difficult (and probably not worth the effort) to do much better than this.

In particular, the standard PIM-SM procedure of electing the candidate entry point 930 closest to the source 940 as the preferred entry point 930, does not actually perform much better than an arbitrary selection. If the external networks have much higher capacity than the radio network, then the standard procedure actually optimizes the wrong thing: it optimizes the path through the higher-capacity network, ignoring the load on the lower-capacity radio network. On the other hand, if the external networks have much lower capacity than the radio network, then the differences in path length through the external networks will have dominated the reverse-shortest-path calculations and the reverse-shortest-path algorithms will already have converged on the one entry point 930 closest to the source 940 (or a small set of entry points 930 close to the source 940).

For these reasons, a simple distance-independent rule for choosing the preferred entry point 930, such as always choosing the highest numbered candidate entry point 930, should provide adequate performance. What is more, such a rule can be implemented through minor modifications to the procedure for redundant JOIN/PRUNE suppression, with little computational complexity and no additional load on the network.

Figure 12:
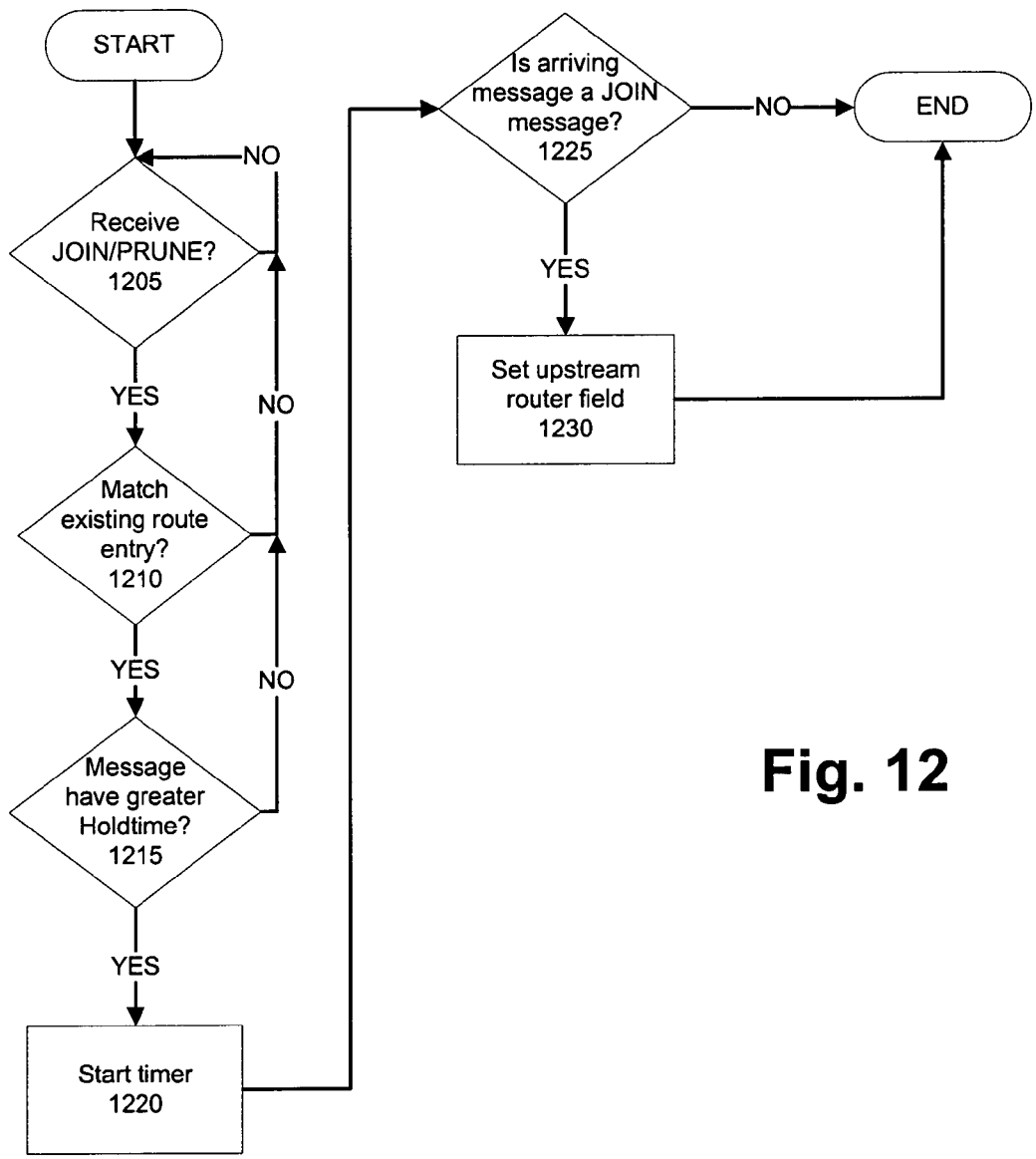
FIG. 12 is a flow diagram illustrating a process for M-PIM-SM JOIN/PRUNE suppression, according to an embodiment.

Accordingly, embodiments discussed herein use the process outlined in FIG. 12 for JOIN/PRUNE suppression. In step 1205, the process wait for the arrival of a JOIN/PRUNE message. If a Join/Prune message arrives, control proceeds to step 1210.

In step 1210, if the JOIN/PRUNE message matches on the incoming interface for an existing (S,G), (*,G), or (*,*,RP) route entry, control proceeds to step 1215. Otherwise control returns to step 1205.

In step 1215, if the Holdtime included in the JOIN/PRUNE message is greater than the recipient's own JOIN/PRUNE-Holdtime (with ties resolved in favor of the higher network layer address), control proceeds to step 1220. Otherwise, control returns to step 105.

In step 1220, a timer (the JOIN/PRUNE-Suppression-timer) in the recipient's route entry is started to suppress further JOIN/PRUNE messages. Control proceeds to step 125.

In step 1225, the process determines whether the arriving message is a JOIN message. If so, control proceeds to step 1230; otherwise, the process ends.

In step 1230, the recipient sets the upstream router field of the route entry to equal the upstream router specified in the received JOIN message, possibly triggering an interlayer group membership request as discussed above. The process ends following step 1230.

It should be apparent that, according to the process described in FIG. 12, the JOIN/PRUNE-Suppression-timer should be restarted each time a JOIN/PRUNE message is received with a higher Holdtime. After this timer expires, the recipient recomputes the upstream router for this route entry based upon the usual reverse-shortest-path algorithm, triggers a JOIN/PRUNE message, and resumes sending periodic JOIN/PRUNE messages, for this entry.

The effect of the JOIN/PRUNE election heuristic depicted in FIG. 12 will be to choose the exit point 910 using the longest JOIN/PRUNE-Holdtime (and, after that, with the highest address) as the preferred generator of JOIN/PRUNE messages, and the entry point 930 that it has selected by its reverse-shortest-path algorithm is chosen as the preferred entry point 930 for every exit point 910 on the network.

Note that the rule modification for PIM-DM preferred entry point election disclosed below would not give good results for PIM-SM in the case where group membership were sparse.

III.D.2. Exemplary Modification of PIM-DM for Entry Point Election

The procedure described above for election of a single entry point 930 through JOIN/PRUNE suppression cannot be used with PIM-DM, since JOIN messages are not necessarily sent under PIM-DM. However, reasonably good performance should be obtainable with PIM-DM by always choosing the closest entry point 930 to the source 940, regardless of the distribution of group members (and hence independent of group). As those skilled in the art will recognize, by its nature, PIM-DM does not perform well unless the distribution of group members is dense; and even using the standard PIM-DM ASSERT mechanism every such group is likely to elect the entry point 930 closest to the source 940 (or a close approximation thereof) as its preferred entry point 930 anyway. In those cases where this assumption is violated, PIM-DM is not a suitable routing algorithm anyway.

Election of the closest entry point 930 to the source 940 as the preferred entry point 930 can be achieved in either of two ways:

(1) The usual ASSERT mechanism, i.e. the assert mechanism of PIM as presently known, can be maintained, but made group-independent. Hence, the factor of $N_{Groups}$ falls out of the scaling formula discussed above, so that ASSERT messages now scale as $N_{Srcs} N_{EntryRtrs}$/Src, which, while not perfect, is much better. Note that this scaling requires that every entry point 930 itself belong to every group for which it sources traffic, which is not necessarily a bad assumption for groups supportable by PIM-DM; or (2) Each potential entry point 930 can determine if it is closest entry point 930 from the low bandwidth network to any source for which it receives traffic by executing a reverse-path Dijkstra computation, such as will be known to those skilled in the art, rooted at a pseudo-node that is assumed to be distance 0, i.e., no distance, from every real node on the network. It should be understood that this computation is not the same as computing the shortest path from a potential entry point to the source, and cannot be determined from the IP unicast forwarding table. This computation requires that the underlying unicast routing protocol provide full link-state information, and that the PIM implementation have access to this link-state information.

Due to the complexity of the communications mechanisms between unicast and multicast routing that would be required to implement option (2), and the complications created by the possibility that the unicast routing domain may be split across multiple OSPF areas for which full link-state information is not available, it is currently generally preferable to implement alternative (1) above.

III.E. Generation of ICMP Redirects for Networks Split Across Multiple OSPF Areas Those skilled in the art will be aware that some versions of OSPF, e.g., OSPF 3 for version 6 IP, fully disclosed in R. Coltun et al., RFC 2740, "OSPF for IPv6," December 1999, published by the Internet Society of Reston, Va., available on the World Wide Web, and fully incorporated herein by reference in its entirety, and R-OSPF as described in presently co-pending U.S. application Ser. No. 10/752,988, entitled "SYSTEMS AND METHODS FOR CONSTRUCTING A VIRTUAL MODEL OF A MULTI-HOP, MULTI-ACCESS NETWORK," can split a single network across multiple OSPF areas. This capability can create a problem for PIM, since a router in one area may not have sufficient routing information to compute the appropriate previous hop to specify in a JOIN/PRUNE message when the appropriate entry point 930 for multicast traffic lies in a different area.

Figure 13:
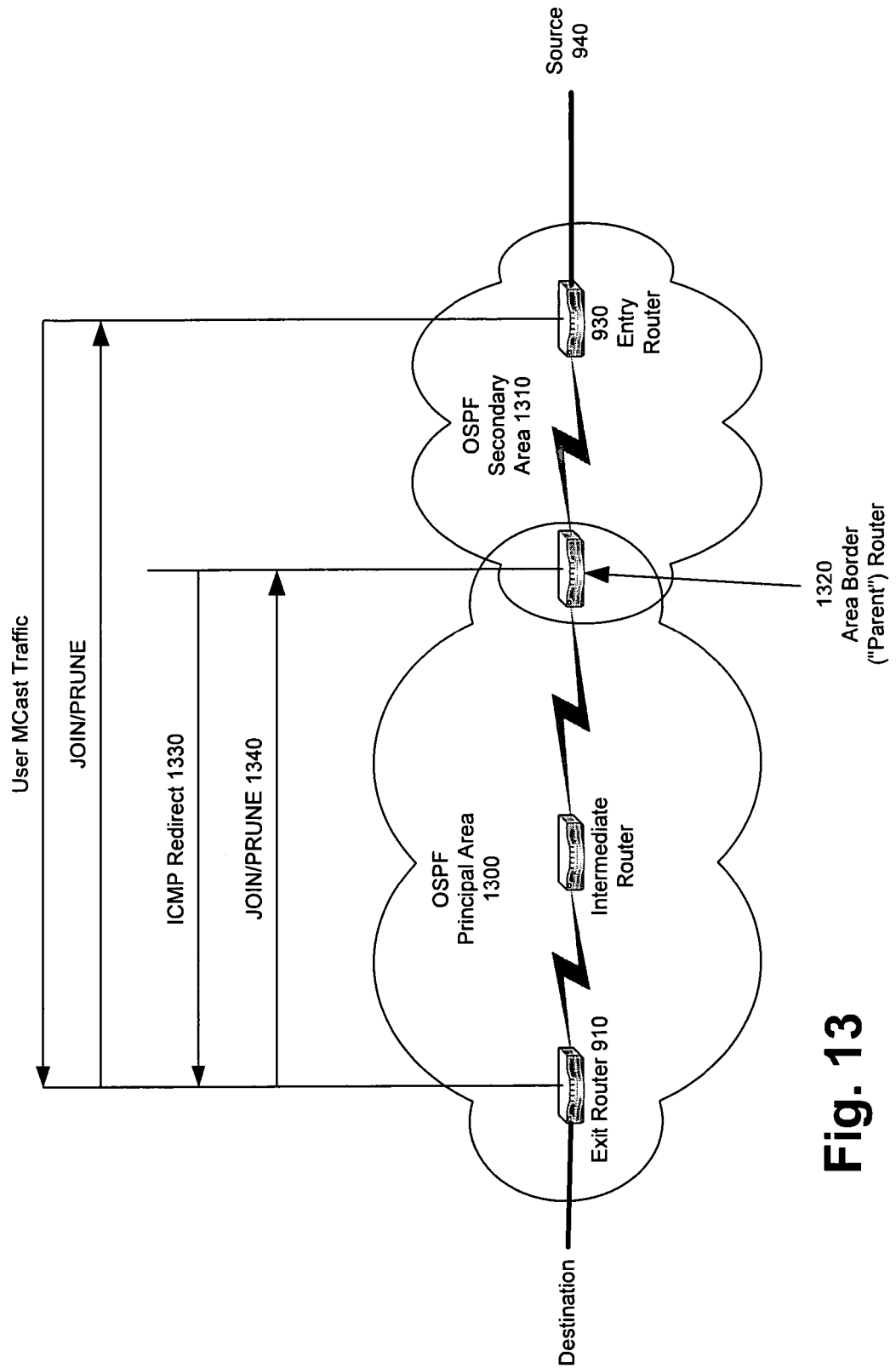
FIG. 13 shows use of an Internet Control Message Protocol (ICMP) redirect 1330 on the routing of multicast traffic over a low bandwidth network split across OSPF areas 1300 and 1310, according to an embodiment.

FIG. 13 shows use of an Internet Control Message Protocol (ICMP) redirect 1330 on the routing of multicast traffic over a low bandwidth network split across OSPF areas 1300 and 1310, according to an embodiment. ICMP is fully disclosed in RFC 792, incorporated herein by reference above. The M-PIM JOIN/PRUNE message 1340 initially generated by the multicast exit router 910 incorrectly specifies the area border router 1320 as the upstream router towards the source 940, because the exit router 910 lacks the unicast routing information needed to compute the upstream router correctly. When sufficient routing information for computing the appropriate previous hop is lacking, information in a router 910 concerning the path to the multicast source 940 (or RP) will terminate at the area border router 1320, and the router 910 would therefore specify the area border router 1320 as the "previous hop" towards the source 940 (or RP). Since multicast group definitions on a lower-layer network, e.g., a network 530, are independent of the division into OSPF areas, both the area border router 1320 and the proper entry point 930 would receive the JOIN/PRUNE message 1340; but only the area border router 1320 would recognize itself as the intended "upstream router" for the recipient. Even worse, the exit router 910, according to the rules described above with reference to Tables 4 and 5, would have set the source field in its interlayer group membership request to point to the area border router 1320, rather than the proper "upstream router", entry router 930.

In order to rectify this situation, an OSPF area border router 1320 must generate an ICMP redirect 1330 to the sender of a JOIN/PRUNE message 1340 (i.e., the exit point 910) any time different OSPF areas 1300, 1310, etc. exist in a network. A router 910 can recognize the existence of different areas 1300, 1310, etc. when the router 910 attempts to create (S,G) state in response to the received JOIN/PRUNE message 1340 and computes its own identification of the "upstream router", for the "upstream router" will lie on the same IP interface as that on which the router 910 received the JOIN/PRUNE message 1340.

Accordingly, the area border router 1320 must respond to the JOIN/PRUNE message 1340 from the exit router 910 with an ICMP redirect 1330, changing the unicast forwarding table on the exit router 930 so that the exit router 910 now computes the true entry router 930 as the upstream next hop back towards the source 940. Accordingly, user multicast traffic will the flow correctly through lower network layers from the entry router 930 to the exit router 910, without necessarily passing through the area border router 1320. Moreover, any router that receives a JOIN/PRUNE message 1340 specifying itself (incorrectly) as the upstream router should follow this procedure, so that it does not matter whether a router is an OSPF border gateway or not. Thus, cases are covered in which a previously redirected route (by previous ICMP redirects) has become invalid due to routing changes.

The process disclosed above is similar to the known mechanism employed in R-OSPF, discussed above, unicast routing for determining the proper "next hop" when a router lies in a different OSPF area, except that under R-OSPF explicit intervention may be required by multicast routing to generate a needed ICMP redirect 1330. If a multicast exit router 910 already has attempted to send unicast traffic to a multicast source 940, then the unicast routing tables in the router 910 may already have been updated by the unicast routing system using ICMP redirects to contain correct information. In that case, no special action is required by the multicast routing system. However, if the multicast exit point 910 does not have any unicast traffic for the multicast source 940, then its unicast forwarding table will not yet contain this information, and the multicast routing system must then trigger the necessary updating as just described.

It should be understood that ICMP redirects 1330 are not generated in response to multicast data packets, but are only generated in response to JOIN/PRUNE messages 1340.

III.F. Backup Rendezvous Points (Modification to PIM-SM)

As is known, and has been discussed above, maximum robustness in the face of potential network partitions and router failures requires that every, or almost every, member of a multicast group be designated as a candidate rendezvous-point (RP) for that group according to PIM. Unfortunately, as discussed above, PIM communication messages such as CANDIDATE_RP_ADVERTISEMENT and BOOTSTRAP messages do not scale well to large numbers of rendezvous-points per group, as every candidate rendezvous-point must send a CANDIDATE_RP_ADVERTISEMENT to the bootstrap router and the BOOTSTRAP message broadcast by the bootstrap router normally lists every candidate rendezvous-point on the network.

Accordingly, certain embodiments disclosed herein use the novel concept of a "backup rendezvous point." A backup rendezvous point is similar to a low-priority rendezvous point as is presently known under PIM. However, backup rendezvous points in M-PIM do not advertise themselves by means of CANDIDATE_ADVERTISEMENT messages unless no higher-priority rendezvous-point (or, for candidate RPs specific to a single group, no rendezvous point with the same priority but higher address) is already listed in the BOOTSTRAP message. Omitting CANDIDATE_RP_ADVERTISEMENT messages from low-priority rendezvous points and, consequently, the BOOTSTRAP message, has no deleterious effects on multicast network operation, because only the highest-priority rendezvous points are ever used, and these rendezvous points are always advertised. Further, no more than one "backup rendezvous point" will ever announce itself at any one time.

If all of the regular (high-priority) rendezvous-points fail, then they will be deleted from the BOOTSTRAP message. The highest priority backup rendezvous points would then begin sending CANDIDATE_RP_ADVERTISEMENT messages, and one of them would take over as the rendezvous-point. The rollover time would be longer than if all such candidate rendezvous-points had been listed originally, but that is a small price to pay for the extra robustness made possible by the larger number of candidate rendezvous-points.

Any PIM-SM router that is aware of this convention could in principle operate as a "backup rendezvous point." However, in some embodiments, only routers that implement are expected to implement backup rendezvous points are programmed to operate as a backup rendezvous point. Thus, no modifications are needed to any presently existing PIM-SM router unless it is desired that the router operate as a "backup rendezvous point."

The treatment of backup candidate rendezvous-points for a single group is slightly different from the treatment of rendezvous-points for an aggregated group. If the set of backup candidate rendezvous-points is specific to a single group, no more than one actual RP will be elected. This is why the backup candidate RP does not announce itself by means of a CANDIDATE_RP_ADVERTISEMENT unless no higher priority RP, or RP with the same priority but a higher address, is already listed in the BOOTSTRAP message. However, when groups are aggregated, PIM will elect different RPs for each group even from a single set of candidate RPs, thus better distributing the data traffic load. Accordingly, if a current router 810 is configured as a backup candidate RP for a group aggregate, the current router 810 should be configured to announce itself even if other RPs with the same priority are already listed in the BOOTSTRAP message.

Preferably, any PIM-SM or M-PIM-SM router which belonged to a particular group, or which acted as the designated router for some network with a host that belonged to that group, is automatically enabled as a backup rendezvous point for that group. Then, no matter how a network is partitioned, any partition which contained at least one member of a group would also be guaranteed to contain at least one candidate rendezvous-point for that group, and that candidate rendezvous-point would be near at least one of the group members (important for minimizing the load from user traffic when groups are tightly localized). Indeed, with this convention, it would not be necessary to configure any standard rendezvous points for such groups unless manual control over the location of the rendezvous point were desired.

Unfortunately, since present PIM-SM routers would not be aware of the above-described convention for backup RPs, one could still be left with no rendezvous point. To cover this case, every router configured to act as a backup RP must also act as a backup rendezvous point for the wild-card group as well. Then if no more specific rendezvous-point can be found, the wild-card rendezvous point (*,*,RP) will be used instead. Accordingly, no matter how a network is partitioned, there will always be at least one router in each partition advertising itself as a candidate rendezvous point for every group. Advantageously, this strategy creates minimum overhead in the form of only one extra CANDIDATE_RP_ADVERTISEMENT and entry in the BOOTSTRAP message.

IV. Configuring Networks for Use with M-PIM

This section discusses considerations regarding the configurations of upper layer 410 and middle layer 430 networks for use over a low bandwidth network layer 450 that employs M-PIM. It should be understood that this discussion is provided solely for the purposes of illustration and to provide a context for the use of M-PIM, and that M-PIM could be deployed entirely differently than is described in this section.

IV.A. Upper Layer Configuration
IV.A.1. Assignment of Group Addresses

M-PIM imposes no constraints on the assignment of group addresses in an upper layer network 805, 410, etc. However, for the sake of convenience, it is preferable that one range of addresses be used for PIM-DM, and another for PIM-SM.

IV.A.2. Choosing a Protocol

The M-PIM design allows simultaneous use of both PIM-DM and PIM-SM for different groups in upper network layers 805, 410, 430, etc. Some groups may be supported by PIM-DM, and others supported by PIM-SM. It will be understood that the choice of protocol for each group or range of groups must be statically configured, as the protocol must be the same for all routers in the PIM domain.

The choice as to which multicast groups in upper network layers 805, 410, 430, etc. should be supported by each protocol depends critically upon the expected number of sources for the group, and the expected distribution of group members (i.e., multicast traffic recipients). As a general rule, PIM-DM should be employed only if the number of sources is expected to be small, and if the group members are expected to be distributed densely throughout the network. If the first condition is not met, then PIM-DM JOIN/PRUNE overhead will become excessive due to the large number of sources. If the second condition is not met, PIM-DM will be wasteful of network bandwidth due to leakage of user traffic onto inappropriate networks or inappropriate portions of the multi-hop radio network, and the oscillatory JOIN/LEAVE information that PIM-DM will provide to lower layers may trigger excessive overhead at these lower layers. Unless both conditions for the utilization of PIM-DM are satisfied, PIM-SM should be employed instead.

"Distributed densely" as used in the forgoing paragraph means that the set of entry and exit points from the multi-hop network that would be selected by IP-layer multicast routing are so positioned that almost every transmission device, e.g., radio, acoustic device etc. in the multi-hop radio network would lie within interference range of some router along the radio-layer path from some entry point to some exit point.

IV.A.3. Configuration of M-PIM-SM Rendezvous-Points

Rendezvous points should generally be located as close as possible to expected senders (sources) and recipients (group members), to minimize user load on the network. If it can be determined which routers are most likely to be centrally located, they should be assigned the highest priority for selection as RPs. The greatest robustness is achieved by having the largest possible set of candidate rendezvous points. There is no limit on the number of M-PIM routers that can be configured as candidate rendezvous points, as the "backup rendezvous point" mechanism employed by M-PIM routers avoids scaling problems.

Absolute protection against network partitions can only be achieved if every M-PIM router is configured as a "backup rendezvous point" for every group, so that every possible partition is guaranteed to contain at least one candidate RP. This can be achieved by configuring every M-PIM router as a "backup rendezvous point" for the wild-card group 0.0.0.0/0.

Groups may also be aggregated using CIDR rules to share a set of candidate rendezvous-points. Such aggregation can further reduce the overhead from CANDIDATE_RP_ADVERTISEMENT and BOOTSTRAP messages. It is particularly beneficial when the number of distinct groups exceeds the number of potential candidate RPs. PIM will elect a set of actual RPs out of this candidate set that distributes the various groups among the various candidate RPs, in the process distributing the network load. To get the maximum advantage out of the backup rendezvous point mechanism in this case, one should assign the highest priority to approximately the same number of routers as there are groups in the aggregate, and then if there are any routers remaining, assign them a lower priority. Unfortunately, one cannot control the assignment of individual RPs to specific groups within this aggregate. Consequently, to avoid excessive overhead from user traffic, it is recommended that groups be aggregated together only when they are approximately co-extensive.

IV.B. Middle Layer Configuration

This section deals with configuring middle layer 430 multicast support for upper layer 410 multicast groups. In the event there are independent middle layer 430 multicast groups, or there is no upper layer 410, the same considerations would apply as discussed above regarding upper layer 410.

IV.B.1. Assignment of Group Addresses and Translation of Upper Layer Multicast Addresses Each upper layer 410 multicast group address must translate to a distinct upper layer 410 multicast address. Accordingly addresses of middle layer 430 groups that support upper layer 410 groups should be separate from those used for middle layer 430 groups (if any).

If there are multiple upper layer 410 networks 510 over a single middle layer 430 network 520, then the multicast addresses for each upper layer 410 network 510 should translate into distinct middle layer 430 addresses even if the same middle layer 430 address is used by more than one network 510. This is likely to be an issue especially for the special range of pre-assigned addresses 224.0.0.1 to 224.0.0.255, which will be replicated on each upper layer 410 network 520. It is suggested that a separate middle layer 430 address range be set aside to support each upper layer 410 network.

If the middle layer 430 multicast routing domain includes any portions of the public Internet, then the middle layer 430 multicast address assignments must conform to the conventions and allocations determined by the Internet Assigned Numbers Authority (IANA) as known by those skilled in the art. In particular, the multicast address range of 232.0.0.0/8 is reserved for use by source-specific multicast. All middle layer 430 groups supporting upper layer 410 PIM groups should probably fall within this range.

IV.B.2. Choice of Protocol: PIM-DM Vs. PIM-SM

In general, an upper layer 410 PIM-DM group may be supported by either a PIM-DM or a PIM-SM group on a middle layer 430; and the same two options exist for upper layer 410 PIM-SM groups as well. However, not all combinations make sense in terms of optimizing network performance. For example, in general it is preferable that an upper layer 410 PIM-SM group should be supported by a middle layer 430 PIM-SM group. Moreover, it is unlikely that a group's memberships might be "sparse" at an upper layer 410, but "dense" at a middle layer 430.

Whether an upper layer 410 PIM-DM group should be supported by a middle layer 430 PIM-SM PIM-DM group depends upon how dense the upper layer 410 network is in the middle layer 430 network. If almost every middle layer 430 router is also an upper layer 410 router, then it makes sense to support upper layer 410 PIM-DM groups by corresponding middle layer 430 PIM-DM groups. The same thing is also true if upper layer 410 routers are dense in the middle layer 430 network, in the sense that there is generally at least one upper layer 410 router within transmission range of each middle layer 430 router.

However, if upper layer 410 routers are sparsely distributed in the middle layer 430 network, then PIM-DM would be a poor choice, and PIM-SM should be employed instead.

IV.B.3. Configuration of M-PIM-SM Rendezvous-Points

No rendezvous-points are needed for middle layer 430 multicast groups that support upper layer 410 multicast groups. Because upper layer 410 PIM-SM and PIM-DM both produce source-specific interlayer group membership requests, the location of the entry points to the middle layer 430 network (i.e., the middle layer 430 multicast source) is known to the middle layer 430 eliminating the need for Rendezvous-Points and PIM REGISTER messages to locate the source. Furthermore, the use of upper layer 410 PIM-SM rendezvous-points already has the effect of reducing the number of entry points to the middle layer 430 network, and there is no further need of middle layer 430 side rendezvous-points to facilitate scaling to large numbers of sources V. Conclusion The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of multicast networking and that the disclosed systems and methods will be incorporated into such future embodiments. Accordingly, it should be understood that the invention is capable of modification and variation and is limited only by the following claims.

We claim:

1. A system, comprising:
a computing device configured to facilitate the transport of multicast traffic in a first network, the first network being a low bandwidth multi-hop network having at least one interface to a second network that is configured to transport multicast traffic according to a protocol independent multicast (PIM) routing protocol;
wherein the first network operates according to a modified protocol independent multicast (M-PIM) routing protocol that includes at least one modification of PIM, the modification being an optimization for low bandwidth multi-hop networks;
whereby the first network operates as a transit network for the second network to facilitate the transport of multicast traffic; and
wherein the at least one modification is a modification to PIM dense mode (PIM-DM) and wherein the at least one modification comprises a specification for group-independent ASSERT messages, thereby reducing the bandwidth consumed by group-specific ASSERT messages in the first network; or
wherein the first network includes multiple entry points and the at least one modification comprises a specification for electing a single entry point to the first network based exclusively on the use of JOIN/PRUNE messages, thereby reducing the consumption of bandwidth in the first network.

2. The system of claim 1, wherein the at least one modification comprises a specification that a multicast router may derive information relating to the identity of one or more neighboring routers from an internet protocol (IP) unicast forwarding table, thereby minimizing or eliminating bandwidth consumption by PIM HELLO messages.

3. The system of claim 1, wherein M-PIM is deployed as a lower layer protocol in a multi-layer routing system on the first network and the least one modification includes accepting group membership information from an upper layer multicast routing protocol on at least one of the first and second networks.

4. The system of claim 1, wherein M-PIM is deployed as an upper layer protocol in a multi-layer routing system on the first network and the least one modification includes generating group membership information for a lower layer multicast routing protocol on at least one of the first and second networks.

5. The system of claim 1, wherein the at least one modification is a modification to PIM dense mode (PIM-DM).

6. The system of claim 5, wherein the at least one modification comprises a specification for group-independent ASSERT messages, thereby reducing the bandwidth consumed by group-specific ASSERT messages in the first network.

7. The system of claim 6, wherein the first network includes multiple entry points, and further wherein group-independent ASSERT messages are used to elect a single entry point to the first network, the first network being a low bandwidth network.

8. The system of claim 1, wherein the at least one modification is a modification to PIM sparse mode (PIM-SM).

9. The system of claim 8, wherein the first network includes multiple entry points and the at least one modification comprises a specification for electing a single entry point to the first network based exclusively on the use of JOIN/PRUNE messages, thereby reducing the consumption of bandwidth in the first network.

10. The system of claim 8, wherein the at least one modification includes a specification for at least one backup rendezvous point that advertises itself as a rendezvous point if and only if a preferred rendezvous point cannot be found, thereby reducing the bandwidth consumed by PIM communication messages in the first network.

11. The system of claim 1, wherein the at least one network comprises two or more logical sub-networks, each sub-network being associated with Internet Protocol (IP) addresses in a Classless Inter-Domain Routing (CIDR) range that does not overlap the CIDR range associated with any other sub-network, thereby resulting in two or more CIDR ranges in the at least one network.

12. The system of claim 11, wherein the CIDR range for each sub-network corresponds to an Open Shortest Path First (OSPF) area that does not overlap the OSPF are associated with any other sub-network.

13. The system of claim 11, wherein the at least one modification includes a specification for generating messages to the sender of a JOIN/PRUNE message in the at least one network by routers with IP addresses in more than one of the CIDR ranges in response to attempts to create an (S,G) state specifying an upstream router in the at least one network.

14. The system of claim 11, wherein the at least one modification includes a specification for use of the messages to the sender of a JOIN/PRUNE message by a recipient router to modify a unicast routing table, thereby modifying an identification of a M-PIM upstream router in the recipient router.

15. The system of claim 1, wherein the first network is a low bandwidth network and the second network is a high bandwidth network.

16. The system of claim 1, wherein the modification is a modification for increasing the efficiency of a low bandwidth network.

17. A non-transitory computer-readable medium tangibly embodying computer-executable instructions including instructions for:

facilitating the transport of non-transitory multicast traffic in a multi-layer routing system that comprises:
  a first network layer that operates according to a multicast routing protocol;
  a second network layer that operates according to a modified protocol independent multicast (M-PIM) routing protocol that includes at least one modification of protocol independent multicast (PIM) routing the modification being an optimization for a low bandwidth multi-hop network; and
  wherein the at least one modification is a modification to PIM dense mode (PIM-DM) and wherein the at least one modification includes a specification for group-independent ASSERT messages, thereby reducing the bandwidth consumed by group-specific ASSERT messages in the first network; or
  wherein the at least one low bandwidth multi-hop network includes multiple entry points and the at least one modification includes a specification for electing a single entry point to the at least one network based exclusively on the use of JOIN/PRUNE messages, thereby reducing the consumption of bandwidth in the first network layer.

18. The computer-readable medium of claim 17, wherein the second network layer is an upper layer, thereby resulting in M-PIM being an upper layer protocol in the multi-layer routing system.

19. The computer-readable medium of claim 18, wherein the at least one modification includes a specification for deriving group membership information for a lower layer multicast routing protocol on the at least one network from M-PIM multicast routing information, thereby determining a set of routers on the at least one network to which multicast traffic for a specific group is to be delivered.

20. The computer-readable medium of claim 17, wherein the multicast routing protocol is one of PIM and M-PIM.

21. The computer-readable medium of claim 17, wherein the second network layer is a lower layer, thereby resulting in M-PIM being a lower layer protocol in the multi-layer routing system.

22. The computer-readable medium of claim 21, wherein the at least one modification includes a specification for accepting group membership information from an upper layer multicast routing protocol in the multi-layer routing system that specifically identifies a source of multicast traffic in the lower layer.

23. The computer-readable medium of claim 22, wherein the at least one modification includes a specification for sending JOIN/PRUNE messages directly to the lower layer source as determined from the upper layer information, without use of a rendezvous-point.

24. The computer-readable medium of claim 17, wherein the at least one low bandwidth multi-hop network comprises two or more logical sub-networks, each sub-network being associated with Internet Protocol (IP) addresses in a Classless Inter-Domain Routing (CIDR) range that does not overlap the CIDR range associated with any other sub-network, thereby resulting in two or more CIDR ranges in the at least one network.

25. The computer-readable medium of claim 24, wherein the CIDR range for each sub-network corresponds to an Open Shortest Path First (OSPF) area that does not overlap the OSPF are associated with any other sub-network.

26. The computer-readable medium of claim 24, wherein the at least one modification includes a specification for generating messages to the sender of a JOIN/PRUNE message in the at least one network by routers with IP addresses in more than one of the CIDR ranges in response to attempts to create an (S,G) state specifying an upstream router in the at least one network.

27. The computer-readable medium of claim 26, wherein the at least one modification includes a specification for use of the messages to the sender of a JOIN/PRUNE message by a recipient router to modify a unicast routing table, thereby modifying an identification of a M-PIM upstream router in the recipient router.

28. The computer-readable medium of claim 17, wherein the at least one modification includes a specification for a multicast router to derive information relating to the identity of one or more neighboring routers from a unicast forwarding table, thereby minimizing or eliminating bandwidth consumption by PIM HELLO messages.

29. The computer-readable medium of claim 17, wherein the at least one modification is a modification to PIM dense mode (PIM-DM).

30. The computer-readable medium of claim 29, wherein the at least one modification includes a specification for group-independent ASSERT messages, thereby reducing the bandwidth consumed by group-specific ASSERT messages in the at least one network.

31. The computer-readable medium of claim 30, wherein the at least one network includes multiple entry points, and further wherein group-independent ASSERT messages are used to elect a single entry point to the at least one network.

32. The computer-readable medium of claim 17, wherein the at least one modification is a modification to PIM sparse mode (PIM-SM).

33. The computer-readable medium of claim 32, wherein the at least one low bandwidth multi-hop network includes multiple entry points and the at least one modification includes a specification for electing a single entry point to the at least one network based exclusively on the use of JOIN/PRUNE messages, thereby reducing the consumption of bandwidth in the first network layer.

34. The computer-readable medium of claim 32, wherein the at least one modification includes a specification for at least one backup rendezvous point that advertises itself as a rendezvous point if and only if a preferred rendezvous point cannot be found, thereby reducing the bandwidth consumed by PIM communication messages in the at least one network.

35. The computer-readable medium of claim 17, wherein the modification is a modification for increasing the efficiency of the low bandwidth network.

36. A system for transporting multicast data traffic, the system comprising:
a first network that facilitates the transport of multicast traffic, the first network operating according to a modified protocol independent multicast protocol (M-PIM), the M-PIM comprising at least one modification to protocol independent multicast (PIM) that facilitates the transport of multicast traffic;
at least one network interface;
a second network that is connected to the first network via the interface and that is configured to transport multicast traffic according to PIM;
whereby the first network operates as a transit network for the second network to facilitate the transport of multicast traffic; and
wherein the at least one modification is a modification to PIM dense mode (PIM-DM) and wherein the at least one modification comprises a specification for group-independent ASSERT messages, thereby reducing the bandwidth consumed by group-specific ASSERT messages in the first network; or
wherein the first network includes multiple entry points and the at least one modification comprises a specification for electing a single entry point to the first network based exclusively on the use of JOIN/PRUNE messages, thereby reducing the consumption of bandwidth in the first network.

37. The system of claim 36, wherein the at least one modification comprises a specification that a multicast router may derive information relating to the identity of one or more neighboring routers from an internet protocol (IP) unicast forwarding table, thereby minimizing or eliminating bandwidth consumption by PIM HELLO messages.

38. The system of claim 36, wherein M-PIM is deployed as a lower layer protocol in a multi-layer routing system on the first network and the least one modification includes accepting group membership information from an upper layer multicast routing protocol on at least one of the first and second networks.

39. The system of claim 36, wherein M-PIM is deployed as an upper layer protocol in a multi-layer routing system on the first network and the least one modification includes generating group membership information for a lower layer multicast routing protocol on the first network.

40. The system of claim 36, wherein the at least one modification is a modification to PIM dense mode (PIM-DM).

41. The system of claim 40, wherein the at least one modification comprises a specification for group-independent ASSERT messages, thereby reducing the bandwidth consumed by group-specific ASSERT messages in the first network.

42. The system of claim 41, wherein the first network includes multiple entry points, and further wherein group-independent ASSERT messages are used to elect a single entry point to the first network, the first network being a low bandwidth network.

43. The system of claim 36, wherein the at least one modification is a modification to PIM sparse mode (PIM-SM).

44. The system of claim 43, wherein the first network includes multiple entry points and the at least one modification comprises a specification for electing a single entry point to the first network based exclusively on the use of JOIN/PRUNE messages, thereby reducing the consumption of bandwidth in the first network.

45. The system of claim 43, wherein the at least one modification includes a specification for at least one backup rendezvous point that advertises itself as a rendezvous point if and only if a preferred rendezvous point cannot be found, thereby reducing the bandwidth consumed by BOOTSTRAP and RP_CANDIDATE_ADVERTISEMENT messages in the first network.

46. The system of claim 36, wherein the at least one network comprises two or more logical sub-networks, each sub-network being associated with Internet Protocol (IP) addresses in a Classless Inter-Domain Routing (CIDR) range that does not overlap the CIDR range associated with any other sub-network, thereby resulting in two or more CIDR ranges in the at least one network.

47. The system of claim 46, wherein the CIDR range for each sub-network corresponds to an Open Shortest Path First (OSPF) area that does not overlap the OSPF are associated with any other sub-network.

48. The system of claim 46, wherein the at least one modification includes a specification for generating messages to the sender of a JOIN/PRUNE message in the at least one network by routers with IP addresses in more than one of the CIDR ranges in response to attempts to create an (S,G) state specifying an upstream router in the at least one network.

49. The system of claim 46, wherein the at least one modification includes a specification for use of the messages to the sender of a JOIN/PRUNE message by a recipient router to modify a unicast routing table, thereby modifying an identification of a M-PIM upstream router in the recipient router.

50. The system of claim 36, wherein the first network is a low bandwidth network and the second network is a high bandwidth network.

51. The system of claim 36, wherein the modification is a modification for increasing the efficiency of a low bandwidth network.

52. A method for transporting multicast data traffic in a first network and a second network, the method comprising the steps of:
    transporting the multicast traffic in the first network according to a modified protocol independent multicast protocol (M-PIM), said M-PIM comprising at least one modification to protocol independent multicast (PIM) that facilitates the transport of multicast traffic;
    transporting the multicast traffic from the first network to the second network via at least one network interface;
    transporting the multicast traffic in the second network according to PIM; and
    wherein the at least one modification is a modification to PIM dense mode (PIM-DM) and wherein the at least one modification comprises a specification for group-independent ASSERT messages, thereby reducing the bandwidth consumed by group-specific ASSERT messages in the first network; or
    wherein the first network includes multiple entry points and the at least one modification comprises a specification for electing a single entry point to the first network based exclusively on the use of JOIN/PRUNE messages, thereby reducing the consumption of bandwidth in the first network.

53. The method of claim 52, further comprising the step of transporting the multicast traffic from the second network to the first network via the at least one network interface.

54. The method of claim 52, wherein the at least one modification comprises a specification that a multicast router may derive information relating to the identity of one or more neighboring routers from an internet protocol (IP) unicast forwarding table, thereby minimizing or eliminating bandwidth consumption by PIM HELLO messages.

55. The method of claim 52, wherein M-PIM is deployed as a lower layer protocol in a multi-layer routing system on the first network and the least one modification includes accepting group membership information from an upper layer multicast routing protocol on at least one of the first and second networks.

56. The method of claim 52, wherein M-PIM is deployed as an upper layer protocol in a multi-layer routing system on the first network and the least one modification includes generating group membership information for a lower layer multicast routing protocol on the first network.

57. The method of claim 52, wherein the at least one modification is a modification to PIM dense mode (PIM-DM).

58. The method of claim 57, wherein the at least one modification comprises a specification for group-independent ASSERT messages, thereby reducing the bandwidth consumed by group-specific ASSERT messages in the first network.

59. The method of claim 58, wherein the first network includes multiple entry points, and further wherein group-independent ASSERT messages are used to elect a single entry point to the first network, the first network comprising a low bandwidth network.

60. The method of claim 52, wherein the at least one modification is a modification to PIM sparse mode (PIM-SM).

61. The method of claim 60, wherein the first network includes multiple entry points and the at least one modification comprises a specification for electing a single entry point to the first network based exclusively on the use of JOIN/PRUNE messages, thereby reducing the consumption of bandwidth in the first network.

62. The method of claim 60, wherein the at least one modification includes a specification for at least one backup rendezvous point that advertises itself as a rendezvous point if and only if a preferred rendezvous point cannot be found, thereby reducing the bandwidth consumed by PIM communication messages in the first network layer.

63. The method of claim 52, wherein the first network comprises two or more logical sub-networks, each sub-network being associated with Internet Protocol (IP) addresses in a Classless Inter-Domain Routing (CIDR) range that does not overlap the CIDR range associated with any other sub-network, thereby resulting in two or more CIDR ranges in the at least one network.

64. The method of claim 63, wherein the CIDR range for each sub-network corresponds to an Open Shortest Path First (OSPF) area that does not overlap the OSPF are associated with any other sub-network.

65. The M-PIM routing protocol of claim 63, wherein the at least one modification includes a specification for generating messages to the sender of a JOIN/PRUNE message in the at least one network by routers with IP addresses in more than one of the CIDR ranges in response to attempts to create an (S,G) state specifying an upstream router in the at least one network.

66. The M-PIM routing protocol of claim 63, wherein the at least one modification includes a specification for use of the messages to the sender of a JOIN/PRUNE message by a recipient router to modify a unicast routing table, thereby modifying an identification of a M-PIM upstream router in the recipient router.

67. The method of claim 52, wherein the first network comprises a low bandwidth network and the second network comprises a high bandwidth network.

68. The method of claim 52, wherein the modification is a modification for increasing the efficiency of a low bandwidth network.

69. A system for transporting multicast data traffic, the system comprising:
    a router;
    at least one first link connecting the router to at least one first device configured to receive the multicast traffic according to a protocol independent multicast (PIM); and
    at least one second link connecting the router to at least one second device configured to receive data packets according to at least one modification of PIM (M-PIM)
    wherein the at least one first link operates according to a modified protocol independent multicast (M-PIM) routing protocol that includes at least one modification of PIM, the modification being an optimization for low bandwidth multi-hop networks; and
    wherein the at least one modification is a modification to PIM dense mode (PIM-DM) and wherein the at least one modification comprises a specification for group-independent ASSERT messages, thereby reducing the bandwidth consumed by group-specific ASSERT messages in the at least one first link; or wherein the first network includes multiple entry points and the at least one modification comprises a specification for electing a single entry point to the at least one first link based exclusively on the use of JOIN/PRUNE messages, thereby reducing the consumption of bandwidth in the at least one first link.

70. The system of claim 69, wherein the at least one first link is at least one of a multi access link and a point-to-point link.

71. The system of claim 69, wherein the router further comprises computer-executable instructions for transporting the multicast traffic according to PIM.

72. The system of claim 69, wherein the router further comprises computer-executable instructions for transporting the multicast traffic according to M-PIM.

73. The system of claim 69, wherein the at least one first device is not configured to transport the multicast traffic according to M-PIM.

74. The system of claim 69, wherein the at least one second device is not configured to transport the multicast traffic according to PIM.

75. The system of claim 69, wherein the at least one first link comprises a high bandwidth network and the at least one second link comprises a low bandwidth network.

76. The system of claim 69, wherein the router is configured to derive, from information received from the second device, information relating to the membership of at least one group for receiving the multicast traffic.

77. The system of claim 69, wherein the router is configured to receive, from the second device, information relating to the membership of at least one group for receiving the multicast traffic.

78. A method for supporting the transport of multicast traffic across multiple networks, the method comprising the steps of:
    generating, in a first network, a request to join a group that receives multicast traffic from a source;
    sending the request to a second network;
    receiving the request in the second network;
    recording, in the second network, a membership state upon receiving the request;
    wherein said first network is configured to transport the multicast traffic according to protocol independent multicast (PIM), and said second network is configured to transport multicast traffic according to a modified protocol independent multicast protocol (M-PIM), said M-PIM comprising at least one modification to protocol independent multicast (PIM) that facilitates the transport of multicast traffic; and
    wherein the at least one modification is a modification to PIM dense mode (PIM-DM) and wherein the at least one modification comprises a specification for group-independent ASSERT messages, thereby reducing the bandwidth consumed by group-specific ASSERT messages in the first network; or
    wherein the first network includes multiple entry points and the at least one modification comprises a specification for electing a single entry point to the first network based exclusively on the use of JOIN/PRUNE messages, thereby reducing the consumption of bandwidth in the first network.

79. The method of claim 78, wherein the first network is a high bandwidth network and the second network is a low bandwidth network.

80. The method of claim 78, wherein the modification is a modification for increasing the efficiency of a low bandwidth network.

81. A method for supporting the transport of multicast traffic in a multi-layer network environment, the method comprising the steps of:
    generating, in a first network layer, a request to join a group that receives multicast traffic from a source;
    sending the request to a second network layer;
    receiving the request in the second network layer; and
    recording, in the second network layer, a membership state upon receiving the request;
    wherein said first network layer is configured to transport the multicast traffic according to a multicast routing protocol, and said second network layer is configured to transport multicast traffic according to a modified protocol independent multicast protocol (M-PIM), said M-PIM comprising at least one modification to protocol independent multicast (PIM) that facilitates the transport of multicast traffic;
    wherein each of the first network layer and the second network layer includes at least two nodes; and
    wherein the at least one modification is a modification to PIM dense mode (PIM-DM) and wherein the at least one modification comprises a specification for group-independent ASSERT messages, thereby reducing the bandwidth consumed by group-specific ASSERT messages in the first network layer; or
    wherein the first network layer includes multiple entry points and the at least one modification comprises a specification for electing a single entry point to the first network layer based exclusively on the use of JOIN/PRUNE messages, thereby reducing the consumption of bandwidth in the first network layer.

82. The method of claim 81, wherein the modification is a modification for increasing the efficiency of a low bandwidth network.

83. The method of claim 81, wherein the multicast routing protocol is one of PIM and M-PIM.

84. A method for supporting the transport of multicast traffic in a multi-layer network environment, the method comprising the steps of:
    generating, in a first network layer, a request to join a group that receives multicast traffic from a source;
    sending the request to a second network layer;
    receiving the request in the second network layer; and
    recording, in the second network layer, a membership state upon receiving the request;
    wherein said first network layer is configured to transport multicast traffic according to a modified protocol independent multicast protocol (M-PIM), said M-PIM comprising at least one modification to protocol independent multicast (PIM) that facilitates the transport of multicast traffic; and said second network layer is configured to transport multicast traffic according to a multicast routing protocol;
    wherein each of the first network layer and the second network layer includes at least two nodes; and
    wherein the at least one modification is a modification to PIM dense mode (PIM-DM) and wherein the at least one modification comprises a specification for group-independent ASSERT messages, thereby reducing the bandwidth consumed by group-specific ASSERT messages in the first network layer; or
    wherein the first network layer includes multiple entry points and the at least one modification comprises a specification for electing a single entry point to the first network layer based exclusively on the use of JOIN/ PRUNE messages, thereby reducing the consumption of bandwidth in the first network layer.

85. The method of claim 84, wherein the modification is a modification for increasing the efficiency of a low bandwidth network.

86. The method of claim 84, wherein the multicast routing protocol is one of PIM and M-PIM.

* * * * *